US012750474B2

(12) United States Patent
Zhang et al.

(10) Patent No.: US 12,750,474 B2
(45) Date of Patent: Sep. 29, 2026

(54) SIGNALING WHETHER TO USE A FIRST MERGE LIST OR A SECOND MERGE LIST IN VIDEO CODING

(71) Applicant: QUALCOMM Incorporated, San Diego, CA (US)

(72) Inventors: Yan Zhang, San Diego, CA (US); Vadim Seregin, San Diego, CA (US); Hongtao Wang, San Diego, CA (US); Zhi Zhang, Munich (DE); Chun-Chi Chen, San Diego, CA (US); Han Huang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/882,225

(22) Filed: Sep. 11, 2024

(65) Prior Publication Data

US 2025/0119527 A1 Apr. 10, 2025

Related U.S. Application Data

(60) Provisional application No. 63/605,138, filed on Dec. 1, 2023, provisional application No. 63/588,557, filed on Oct. 6, 2023.

(51) Int. Cl.
*H04N 19/157* (2014.01)
*H04N 19/105* (2014.01)
(Continued)

(52) U.S. Cl.
CPC ......... *H04N 19/105* (2014.11); *H04N 19/109* (2014.11); *H04N 19/157* (2014.11);
(Continued)

(58) Field of Classification Search
CPC .. H04N 19/105; H04N 19/109; H04N 19/157; H04N 19/176; H04N 19/44;
(Continued)

(56) References Cited

U.S. PATENT DOCUMENTS

| | | | | |
|---|---|---|---|---|
| 11,589,072 | B2 | 2/2023 | Park et al. | |
| 12,167,001 | B2 * | 12/2024 | Bordes | H04N 19/70 |

(Continued)

OTHER PUBLICATIONS

Chen J., et al., "Non-EE2: DMVR for affine merge coded blocks", JVET-AA0144-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

(Continued)

*Primary Examiner* — Albert Kir

(74) *Attorney, Agent, or Firm* — Shumaker & Sieffert, P. A.

(57) ABSTRACT

Example devices, methods, and computer-readable media are disclosed for decoding video data. An example method includes determining to decode a current block of the video data using a merge mode. The example method includes obtaining a flag from a bitstream. The example method includes determining, based on a value of the flag, to use a second merge list of two merge lists for the current block, wherein the second merge list is based on a first merge list of the two merge lists. The example method includes decoding the current block based on the second merge list.

18 Claims, 22 Drawing Sheets

(51) Int. Cl.

| | |
|---|---|
| ***H04N 19/109*** | (2014.01) |
| ***H04N 19/176*** | (2014.01) |
| ***H04N 19/44*** | (2014.01) |
| ***H04N 19/463*** | (2014.01) |
| ***H04N 19/513*** | (2014.01) |
| ***H04N 19/573*** | (2014.01) |
| ***H04N 19/70*** | (2014.01) |
| *H04N 19/52* | (2014.01) |

(52) U.S. Cl.
CPC ........... *H04N 19/176* (2014.11); *H04N 19/44* (2014.11); *H04N 19/463* (2014.11); *H04N 19/513* (2014.11); *H04N 19/573* (2014.11); *H04N 19/70* (2014.11); *H04N 19/52* (2014.11)

(58) Field of Classification Search
CPC .. H04N 19/463; H04N 19/513; H04N 19/573; H04N 19/70; H04N 19/52
USPC .................................................... 375/240.02
See application file for complete search history.

(56) References Cited

U.S. PATENT DOCUMENTS

| | | | | |
|---|---|---|---|---|
| 2021/0168403 | A1 | 6/2021 | Abe et al. | |
| 2022/0116621 | A1 | 4/2022 | Urban et al. | |
| 2022/0191502 | A1 | 6/2022 | Chen et al. | |
| 2022/0239899 | A1 | 7/2022 | Zhang et al. | |
| 2022/0329822 | A1 | 10/2022 | Chang et al. | |
| 2022/0329823 | A1 | 10/2022 | Chen et al. | |
| 2023/0018401 | A1* | 1/2023 | Galpin | H04N 19/105 |
| 2023/0328276 | A1 | 10/2023 | Zhang et al. | |
| 2024/0022729 | A1 | 1/2024 | Huang et al. | |
| 2024/0121426 | A1 | 4/2024 | Huang et al. | |
| 2024/0195952 | A1* | 6/2024 | Deng | H04N 19/103 |
| 2024/0357125 | A1* | 10/2024 | Chen | H04N 19/105 |
| 2024/0388691 | A1* | 11/2024 | Chen | H04N 19/167 |
| 2025/0047897 | A1* | 2/2025 | Chen | H04N 19/52 |
| 2025/0113052 | A1* | 4/2025 | Li | H04N 19/117 |
| 2025/0113062 | A1 | 4/2025 | Chernyak et al. | |
| 2025/0119527 | A1* | 4/2025 | Zhang | H04N 19/105 |
| 2025/0126240 | A1 | 4/2025 | Kim et al. | |
| 2025/0193389 | A1* | 6/2025 | Xiu | H04N 19/176 |

OTHER PUBLICATIONS

Chen Y., et al., "Description of SDR, HDR and 360° Video Coding Technology Proposal by Qualcomm and Technicolor—Low and High Complexity Versions", 10th JVET Meeting, Apr. 10, 2018-Apr. 20, 2018, San Diego, (The Joint Video Exploration Team of ISO/IEC JTC1/SC29/WG11 and ITU-T SG.16 ), No. JVET-J0021, Apr. 14, 2018, pp. 1-42, XP030248216.

Coban M., et al., "Algorithm Description of Enhanced Compression Model 10 (ECM 10)", JVET-AE2025, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.

Coban M., et al., "Algorithm Description of Enhanced Compression Model 11 (ECM 11)", JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.

Co-pending U.S. Appl. No. 18/882,254, filed Sep. 11, 2024.

Co-pending U.S. Appl. No. 18/882,291, filed Sep. 11, 2024.

Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Salehifar M., et al., "EE2-3.5: Iterative BDOF pass in multi-pass DMVR", JVET-AE0065, Joint Video Experts Team (JVET) of ITU-T SG 16 WP 3 and ISO/IEC JTC 1/SC 29, 31st Meeting, Geneva, CH, Jul. 11-19, 2023, pp. 1-3.

Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Seregin V., "Merge Branch 'fix-keep-pred-and-resi-signals' into 'master'," ECM software, Created on Jul. 22, 2021, pp. 1-3.

Xiu X., et al., "EE2-Test2.7: Improvements on Local Illumination Compensation", JVET-AD0213-v1, Joint Video Experts Team (JVET) of ITU-T SG 16 WP 3 and ISO/IEC JTC 1/SC 29 30th Meeting, Antalya, TR, Apr. 21-28, 2023, pp. 1-5.

Xiu X., et al., "Non-EE2: Enhancements on local illumination compensation", JVET-AF0191-v2, Joint Video Experts Team (JVET) of ITU-T SG 16 WP 3 and ISO/IEC JTC 1/SC 29, 32nd Meeting, Hannover, DE, Oct. 13-20, 2023, pp. 1-3.

Zhang N., et al., "EE2-3.2: LIC flag derivation for merge candidates with template costs", JVET-AF0128-v2, Joint Video Experts Team (JVET) of ITU-T SG 16 WP 3 and ISO/IEC JTC 1/SC 29, 32nd Meeting, Hannover, DE, Oct. 13-20, 2023, pp. 1-3.

Zhang Y., et al., "EE2: Test 2.1, 2.2, 2.5, 2.6a, 2.6e and 2.6f on LIC improvement", JVET-AG0176-v2, Joint Video Experts Team (JVET) of ITU-T SG 16 WP 3 and ISO/IEC JTC 1/SC 29, 33rd Meeting, by teleconference, Jan. 17-26, 2024, pp. 1-6.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

Zhang Y., et al., "Non-EE2: On LIC flag in merge mode", JVET-AF0194, Joint Video Experts Team (JVET) of ITU-T SG 16 WP 3 and ISO/IEC JTC 1/SC 29, 32nd Meeting, Hannover, DE, Oct. 13-20, 2023, pp. 1-2.

Coban M., et al., "Algorithm Description of Enhanced Compression Model 9 (ECM 9)", JVET-AD2025, Joint Video Experts Team (JVET) of ITU-T SG 16 WP 3 and ISO/IEC JTC 1/SC 29, 30th Meeting, Antalya, TR, 2128 Apr. 2023, 142 MPEG Meeting, Apr. 24, 2023-Apr. 28, 2023, Jul. 3, 2023, 75 pages, XP030311068, Section 3.2.14.

International Search Report and Written Opinion—PCT/US2024/046418—ISA/EPO—Dec. 9, 2024 14 Pages.

Wang Y (Bytedance)., et al., "Non-EE2: Local Illumination Compensation with Slope Adjustment", 31. JVET Meeting, Jul. 11, 2023-Jul. 19, 2023, Geneva, CH, (The Joint Video Exploration Team of ISO/IEC JTC1/SC29/WG11 and ITU-T SG.16), No. JVET-AE0177, Jul. 5, 2023, 2 Pages, XP030311535, Section 1.

Zhang N (Bytedance Inc)., et al., "Non-EE2: LIC Flag Derivation of Merge Candidates with Template Costs", 31. JVET Meeting, Jul. 11, 2023-Jul. 19, 2023, Geneva, (The Joint Video Exploration Team of ISO/IEC JTC1/SC29/WG11 and ITU-T SG.16 ), No. JVET-AE0109, Jul. 12, 2023, 5 Pages, XP030311345, p. 3.

Zhang N (Bytedance Inc)., et al., "Non-EE2: LIC Flag Derivation of Merge Candidates with Template Costs", JVET-AE0109-v2, Joint Video Experts Team (JVET) of ITU-T SG 16 WP 3 and ISO/IEC JTC 1/SC 29, 31. JVET Meeting, Jul. 11, 2023-Jul. 19, 2023, Geneva, CH, (The Joint Video Exploration Team of ISO/IEC

(56) References Cited

OTHER PUBLICATIONS

JTC1/SC29/WG11 and ITU-T SG.16 ), No. JVET-AE0109, Jul. 12, 2023, XP030311346, 3 Pages, The Whole Document.
Zhang Y (Qualcomm Incorporated)., et al., "Non-EE2: On LIC Flag in Merge Mode", 32. JVET Meeting, Oct. 13, 2023-Oct. 20, 2023, Hannover, (The Joint Video Exploration Team of ISO/IEC JTC1/SC29/WG11 and ITU-T SG.16 ), No. JVET-AF0194, Oct. 15, 2023, 2 Pages, XP030312379, Section 2.
Bordes P., et al., "CE1-5.4: Mutual Exclusion of LIC and BPWA", JVET-N0283-v2, Joint Video Experts Team (JVET) of ITU-T SG 16 WP 3 and ISO/IEC JTC 1/SC 29/WG 11 14th Meeting: Geneva, CH, Mar. 19-27, 2019, 3 Pages.
Chen J., et al., "Non-EE2: DMVR For Affine Merge Coded Blocks", 27. JVET Meeting, Jul. 13, 2022-Jul. 22, 2022, Teleconference; (The Joint Video Exploration Team of ISO/IEC JTC1/SC29/WG11 and ITU-T SG.16 ), No. JVET-AA0144, m60120, Jul. 18, 2022, 5 Pages, XP030303030, Section 2.
Hordes (Technicolor) P., et al., "CE1-5.4 Mutual Exclusion of LIC and BPWA", 14. JVET Meeting, Mar. 19, 2019-Mar. 27, 2019, Geneva, (The Joint Video Exploration Team of ISO/IEC JTC1/SC29/WG11 and ITU-T SG.16 ), No. JVET-N0283, Mar. 15, 2019, 3 Pages, XP030203226, figure 1.
Huang H., et al., "EE2-Related: Sub-block Processing for Affine DMVR", JVET-AB0177-v2, Joint Video Experts Team (JVET) of ITU-T SG 16 WP 3 and ISO/IEC JTC 1/SC 29 28th Meeting, Mainz, DE, Oct. 20-28, 2022, 3 Pages.
Huang (Qualcomm) H., et al., "EE2-related: Sub-Block Processing for Affine DMVR", 28. JVET Meeting, Oct. 21, 2022-Oct. 28, 2022, Mainz, (The Joint Video Exploration Team of ISO/IEC JTC1/SC29/WG11 and ITU-T SG.16 ), No. JVET-AB0177, m60965, Oct. 17, 2022, 3 Pages, XP030304762, Section 2.

* cited by examiner

EXTENDED CU REGION IN BDOF

SIGNALING WHETHER TO USE A FIRST MERGE LIST OR A SECOND MERGE LIST IN VIDEO CODING

This application claims the benefit of U.S. Provisional Patent Application No. 63/588,557, filed 6 Oct. 2023, and U.S. Provisional Patent Application No. 63/605,138, filed 1 Dec. 2023, the entire content of both of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video codecs. In particular, this disclosure describes techniques related to the interaction between local illumination compensation (LIC) and merge mode. Currently, in some video coding standards and video codecs, for merge mode, the LIC flag and/or bi-prediction with CU level weights (BCW) index are always inherited from neighboring blocks. However, this may not be an optimal solution since illumination changes may occur in the neighboring blocks, but not in the current block or vice versa. The techniques of this disclosure address this issue by not requiring LIC information to be necessarily inherited from neighboring blocks, thus potentially improving coding quality, performance, and/or the like.

In one example, a method includes: determining to decode a current block of the video data using a merge mode; obtaining a flag from a bitstream; determining, based on a value of the flag, to use a second merge list of two merge lists for the current block, wherein the second merge list is based on a first merge list of the two merge lists; and decoding the current block based on the second merge list.

In another example, a device includes one or more processors coupled to one or more memories, the one or more processors being configured to: determine to decode a current block of the video data using a merge mode; obtain a flag from a bitstream; determine, based on a value of the flag, to use a second merge list of two merge lists for the current block, wherein the second merge list is based on a first merge list of the two merge lists; and decode the current block based on the second merge list.

In another example, non-transitory computer-readable media stores instructions, which when executed, cause one or more processors to: determine to decode a current block of video data using a merge mode; obtain a flag from a bitstream; determine, based on a value of the flag, to use a second merge list of two merge lists for the current block, wherein the second merge list is based on a first merge list of the two merge lists; and decode the current block based on the second merge list.

In one example, a method includes: determining to decode a current block of the video data using a merge mode; generating a first merge list for the current block, wherein generating the first merge list comprises applying template matching to candidates of the first merge list; generating, based on the first merge list, a second merge list; and decoding the current block using the merge mode and based on the first merge list or the second merge list.

In another example, a device includes one or more processors coupled to one or more memories, the one or more processors being configured to: determine to decode a current block of the video data using a merge mode; generate a first merge list for the current block including applying template matching to candidates of the first merge list; generate, based on the first merge list, a second merge list; and decode the current block using the merge mode and based on the first merge list or the second merge list.

In another example, non-transitory computer-readable media stores instructions, which when executed, cause one or more processors to: determine to decode a current block of video data using a merge mode; generate a first merge list for the current block including applying template matching to candidates of the first merge list; generate, based on the first merge list, a second merge list; and decode the current block using the merge mode and based on the first merge list or the second merge list.

In one example, a method includes: determining to decode a current block of the video data using a merge mode; determining, for the current block, to apply local illumination compensation (LIC); determining, for the current block, to apply decoder side motion vector refinement (DMVR); and decoding the current block based on applying LIC and applying DMVR.

In another example, a device includes one or more processors coupled to one or more memories, the one or more processors being configured to: determine to decode a current block of the video data using a merge mode; determine, for the current block, to apply local illumination compensation (LIC); determine, for the current block, to apply decoder side motion vector refinement (DMVR); and decode the current block based on applying LIC and applying DMVR.

In another example, non-transitory computer-readable media stores instructions, which when executed, cause one or more processors to: determine to decode a current block of video data using a merge mode; determine, for the current block, to apply local illumination compensation (LIC); determine, for the current block, to apply decoder side motion vector refinement (DMVR); and decode the current block based on applying LIC and applying DMVR.

The details of one or more examples are set forth in the accompanying drawings and the description below. Other features, objects, and advantages will be apparent from the description, drawings, and claims.

DETAILED DESCRIPTION

In general, this disclosure describes techniques for inter prediction in video codecs. In particular, this disclosure describes techniques related to the interaction between local illumination compensation (LIC) and merge mode. Currently, in some video coding standards and video codecs, for merge mode, the LIC flag and/or BCW index are always inherited from neighboring blocks. However, this may not be an optimal solution since illumination changes may occur in the neighboring blocks, but not in the current block or vice versa. The techniques of this disclosure address this issue by not requiring LIC information to be necessarily inherited from neighboring blocks. For example, the techniques of this disclosure may include the use of a first and a second merge list, rather than a single merge list. The second merge list may be based on the first merge list. As such, the first merge list and the second merge list together should not be confused with a L0 list and an L1 list used in bi-prediction. The second merge list may have associated LIC flags that may include LIC flags with values that are different than one or more values of LIC flags associated with the first merge list. The techniques of this disclosure may improve coding quality, performance, and/or the like. A merge list may alternatively be referred to herein as a "candidate list" or a "merge candidate list."

Figure 1:
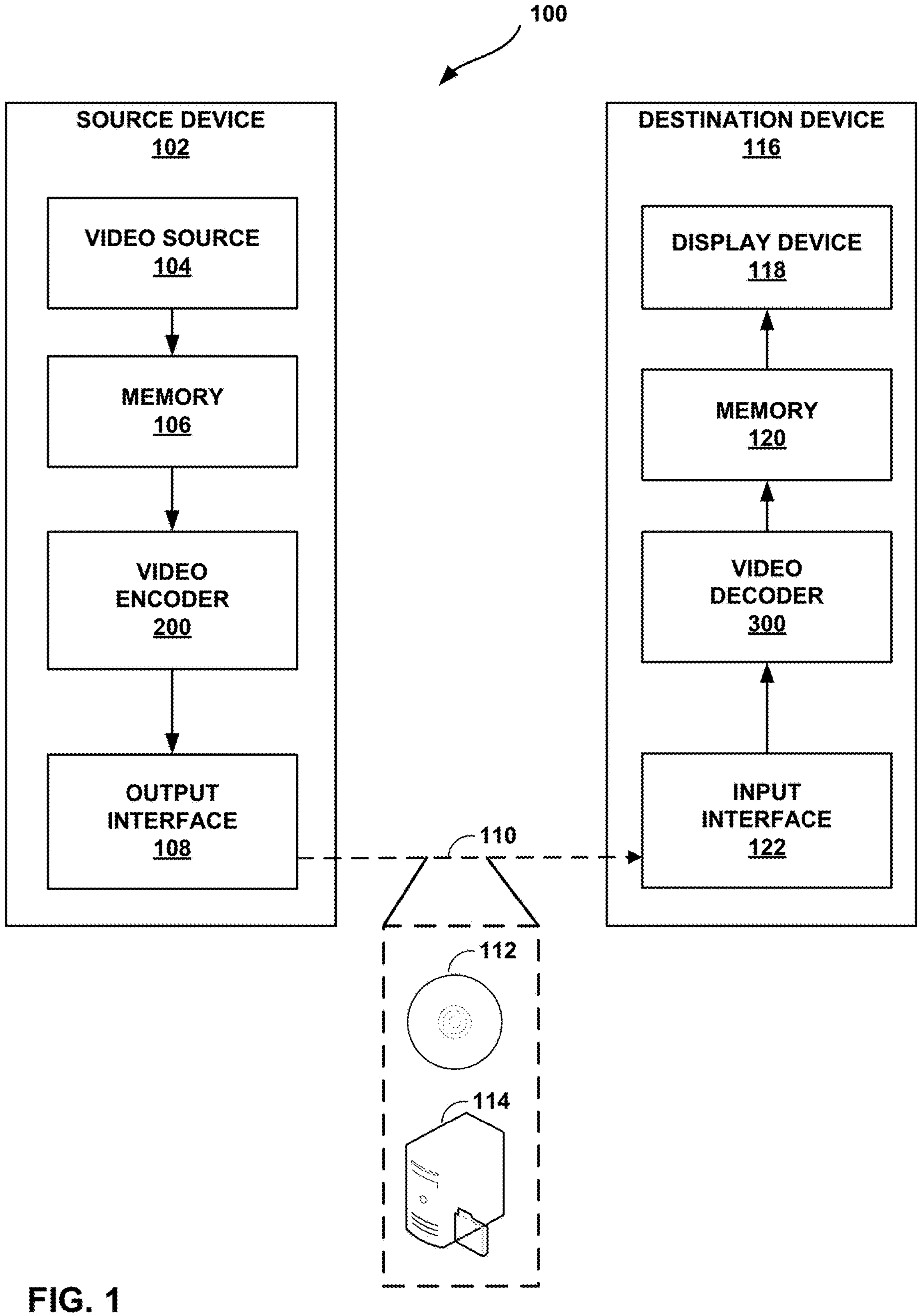
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (e.g., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for the interaction between LIC and merge mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for the interaction between LIC and merge mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, ILBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, Truc Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use LIC and merge mode In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks.

Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method includes determining to apply merge mode to a current block of the video data; determining whether to apply local illumination compensation (LIC) independently of whether LIC is applied to a neighboring block; and coding the current block based on merge mode and the determination of whether to apply LIC.

LIC is an inter prediction technique to model local illumination variation between a current block and its prediction block as a function of that between current block template and a reference block template. The parameters of the function can be denoted by a scale $\alpha$ and an offset $\beta$, which forms a linear equation, that is, $\alpha$*p [x]+$\beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

One example of local illumination compensation proposed in JVET-00066 (V. Seregin, W.-J. Chien, T. Hsieh, N. Hu, M. Karczewicz, C.-M. Tsai, C.-C. Chen, C.-W. Hsu, Y.-W. Huang, S.-M. Lei, H. Chen, X. Ma, H. Yang, "CE4-3.1a and CE4-3.1b: Unidirectional local illumination compensation with affine prediction", JVET-00066, June 2019) may be used for uni-prediction inter CUs with the following modifications: Intra neighbor samples can be used in LIC parameter derivation; LIC is disabled for blocks with less than 32 luma samples; For both non-subblock and affine modes, LIC parameter derivation is performed based on the template block samples corresponding to the current CU, instead of partial template block samples corresponding to first top-left 16×16 unit; and Samples of the reference block template are generated by using MC with the block MV without rounding it to integer-pel precision.

In JVET-AD0213 (X. Xiu, N. Yan, C. Ma, H.-J. Jhu, C.-W. Kuo, W. Chen, X. Wang, "EE2-Test2.7: Improvements on local illumination compensation", JVET-AD0213, April 2023), LIC mode is extended to bi-predictive CUs and is adopted into the Enhanced Compression Mode (ECM), where two different linear models are applied to the two prediction blocks which are then combined to generate the bi-prediction samples of the current CU, e.g., $$P'[x, y] = (1-\omega)\cdot p_0'[x, y] + \omega\cdot p_1'[x, y]$$

and $$p_0'[x, y] = \alpha_0\cdot P_0[x, y] + \beta_0$$

$$p_1'[x, y] = \alpha_1\cdot P_1[x, y] + \beta_1$$

where $\alpha_0$ and $\beta_0$, and $\alpha_1$ and $\beta_1$ indicate the scales and the offsets in L0 and L1, respectively; w indicates the weight (as indicated by the CU-level BCW index) for the weighted combination of L0 and L1 predictions.

The techniques for LIC with bi-predictive CUs first derive the L0 parameters by minimizing difference between L0 template prediction $T_0$ and the template T and the samples in T are updated by subtracting the corresponding samples in $T_0$. Then, the L1 parameters are calculated that minimizes the difference between L1 template prediction $T_1$ and the updated template. Finally, the L0 parameter is refined again in the same way.

Following the current LIC design, one flag is signaled for AMVP bi-predicted CUs for the indication of the LIC mode while the flag is inherited for merge related inter CUs. Additionally, the LIC is disabled for decoder side motion vector refinement (DMVR) and BDOF.

In one example of ECM, the derived LIC model parameter is stored in the CUS since when performing OBMC, the LIC model parameter may additionally be compared to decide whether the OBMC is to be performed. Hence, for a CU with LIC flag equals to true (e.g., 1), a set of LIC model parameter is stored and available for future usage.

In X. Xiu, C. Ma, N. Yan, H.-J. Jhu, C.-W. Kuo, W. Chen, X. Wang, "Non-EE2: Enhancements on local illumination compensation", Hannover, DE, 13-20 Oct. 2023, JVET-AF0191," an example of non-local illumination compensation (NLIC) is proposed. For this technique, instead of using the template samples, the samples of the previously coded CUs are utilized for deriving the linear model used for motion compensation of the current block. Specifically, after the reconstruction of each inter CU (except for geometric partitioning mode (GPM) and sub-block temporal motion vector prediction (SbTMVP) CUs), one linear model is derived by minimizing the difference between the reconstruction and prediction samples of the block. The derived LIC model parameters are also stored. This LIC model is derived irrespective of the LIC flag value of the block. If the LIC flag is true for the CU, then two sets of LIC model parameters are stored. One set is derived between the current template and reference template. Another set is derived by minimizing the difference between the reconstruction and prediction samples of the block. If the LIC flag is false (e.g., 0), then only one set of LIC parameters are stored which is derived between the reconstruction and prediction samples of the block.

In N. Zhang, K, Zhang, H. Liu, Y. Wang, L. Zhang, "EE2-3.2: LIC flag derivation for merge candidates with template costs", Hannover, DE, 13-20 Oct. 2023, JVET-AF0128, a template matching cost-based LIC flag derivation technique is proposed and has been adopted to the ECM reference software. In this technique, the template matching cost is computed twice for the same merge candidate with LIC flag set to true or false each time. The two template matching costs are compared, and a predefined threshold is used to decide whether the LIC flag will be modified. Currently, this technique is only applied to uni-predicted merge candidates.

Regular merge mode is now described. Video encoder 200 or video decoder 300 may derive spatial merge candidates. The derivation of spatial merge candidates in VVC is same to that in HEVC.

Figure 2:
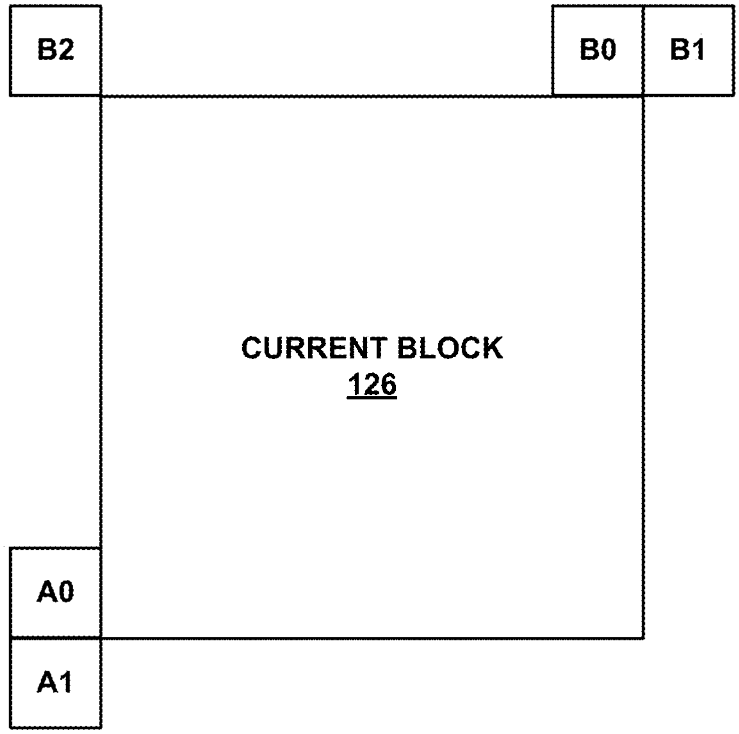
FIG. 2 is a conceptual diagram illustrating example positions of spatial merge candidates.

FIG. 2 is a conceptual diagram illustrating example positions of spatial merge candidates. For current block 126, video encoder 200 or video decoder 300 may select a maximum of four merge candidates among candidates located in the positions depicted in FIG. 2. The order of derivation or selection is $A_0$. $B_0$. $B_1$. $A_1$ and $B_2$. Position $B_2$ is considered only when any CU of position $A_0$, $B_0$, $B_1$, $A_1$ is not available (e.g., because it belongs to another slice or tile) or is intra coded. After candidate at position $A_1$ is added to a merge list, the addition of the remaining candidates is subject to a redundancy check which ensures that candidates with same motion information are excluded from the merge list so that coding efficiency is improved.

Figure 3:
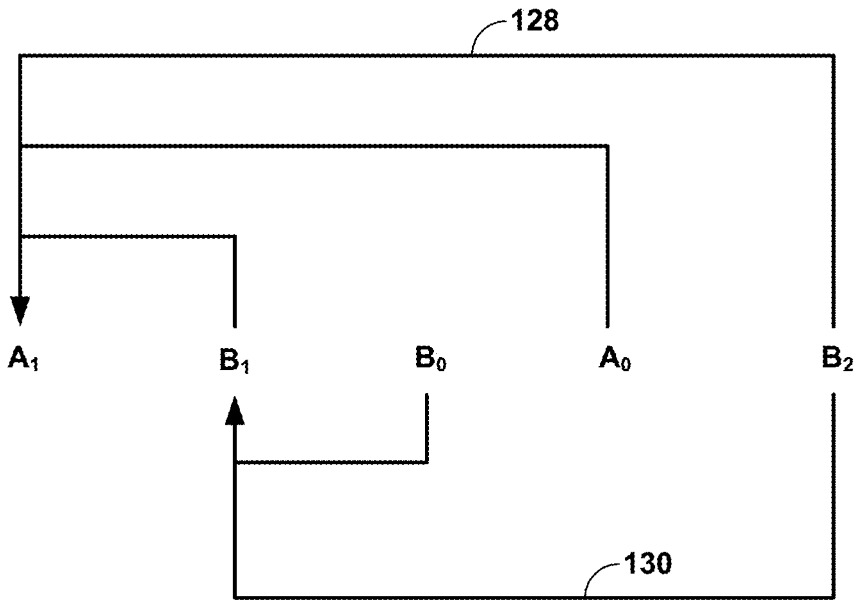
FIG. 3 is a conceptual diagram illustrating example candidate pairs considered for redundancy check of spatial merge candidates.

FIG. 3 is a conceptual diagram illustrating example candidate pairs considered for redundancy check of spatial merge candidates. To reduce computational complexity, not all possible candidate pairs are considered in the mentioned redundancy check. Instead, only the pairs linked with arrow 128 or arrow 130 in FIG. 3 are considered and a candidate is only added to the list if the corresponding candidate used for the redundancy check does not have the same motion information. For example, if the corresponding candidate has the same motion information, video encoder 200 or video decoder 300 may not add the corresponding candidate to the merge list.

Figure 4:
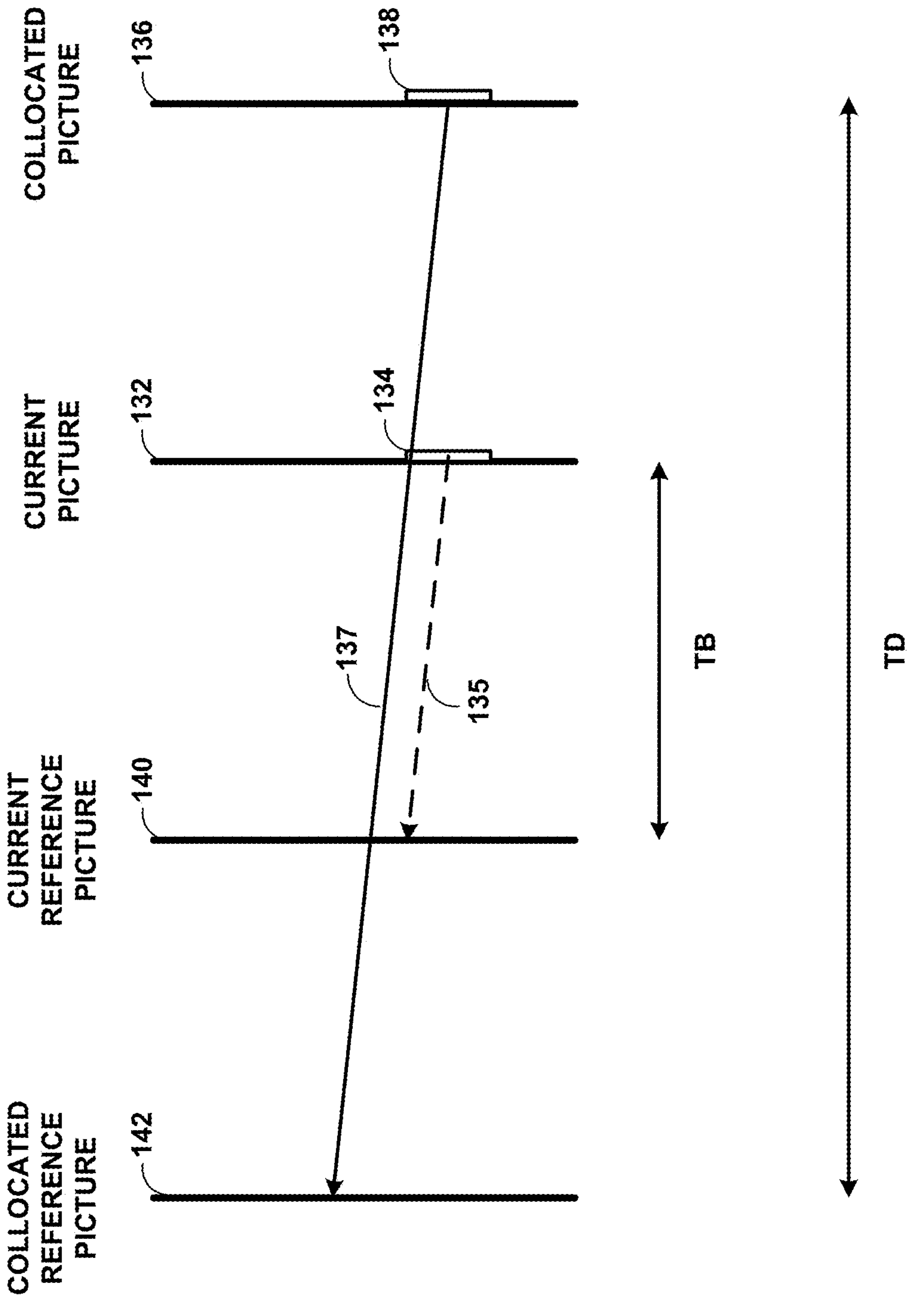
FIG. 4 is a conceptual diagram illustrating an example of motion vector scaling for a temporal merge candidate.

FIG. 4 is a conceptual diagram illustrating an example of motion vector scaling for a temporal merge candidate. In some examples, video encoder 200 or video decoder 300 may derive temporal candidates. In some examples, only one candidate is added to the merge candidate list. Particularly, in the derivation of this temporal merge candidate, a scaled motion vector is derived based on a co-located CU belonging to the collocated reference picture. The reference picture list to be used for derivation of the co-located CU is explicitly signaled in the slice header. The scaled motion vector 135 for the temporal merge candidate is obtained, as illustrated by the dotted line in FIG. 4. The scaled motion vector 135 for current CU 134 is scaled from the motion vector 137 of the co-located CU 138 using the picture order count (POC) distances, tb and td. The POC distance tb is defined to be the POC difference between the current reference picture 140 of the current picture and the current picture 132. The POC difference td is defined to be the POC difference between the reference picture 142 of the co-located picture and the co-located picture 136. The reference picture index of the temporal merge candidate is set equal to zero.

Figure 5:
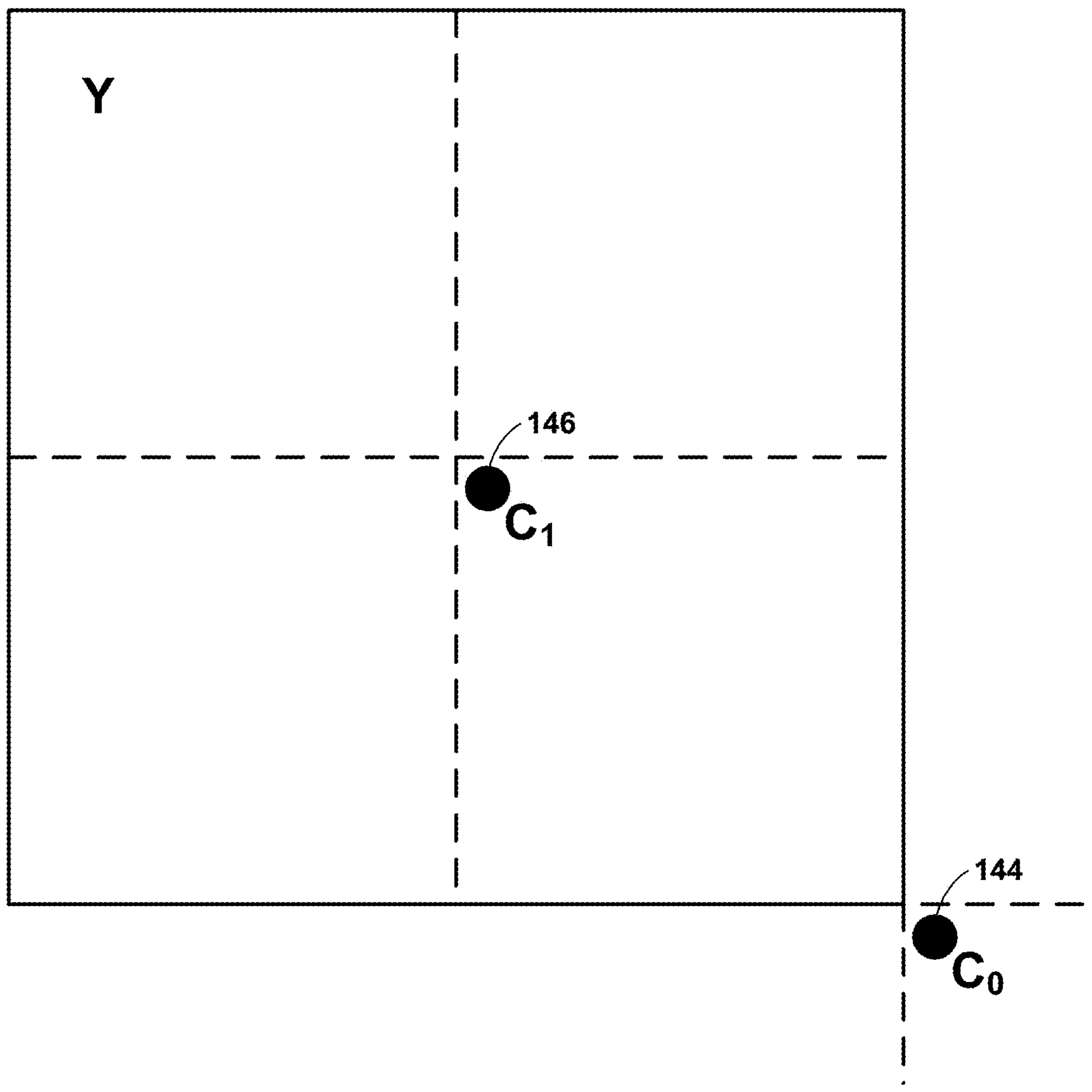
FIG. 5 is a conceptual diagram illustrating example candidate positions for a temporal merge candidate.

FIG. 5 is a conceptual diagram illustrating example candidate positions for a temporal merge candidate. The position for the temporal candidate for current CU 134 (e.g., which may be a luma (Y) block) is selected between candidates $C_0$ 144 and $C_1$ 146, as depicted in FIG. 5. If CU at position $C_0$ 144 is not available, is intra coded, or is outside of the current row of CTUs, position $C_1$ 146 is used. Otherwise, position $C_0$ 144 is used in the derivation of the temporal merge candidate.

Video encoder 200 or video decoder 300 may derive one or more history-based merge candidates. The motion information of a previously coded block is stored in a table (HMVP table) and used as MVP for the current CU. The table with multiple entries is maintained during the encoding/decoding process. When inserting a new motion candidate to the table, a constrained first-in-first-out (FIFO) rule is utilized wherein redundancy check is firstly applied to determine whether there is an identical candidate in the table. If an identical candidate is found, the identical candidate is removed from the table and all the other candidates after the identical candidate in the table are moved forward in the table.

HMVP candidates are added to merge list (which may also be referred to as a candidate list herein) after the spatial and temporal merge candidates, wherein the latest several HMVP candidates in the table are checked in order and inserted to the candidate list after the TMVP candidate. Some redundancy checks may be applied on the HMVP candidates before insertion into the candidate list.

Video encoder 200 or video decoder 300 may derive pair-wise average merge candidates. Pairwise average merge candidates are generated by averaging predefined pairs of candidates in the existing merge list. The averaged motion vectors are calculated separately for each reference list. If both motion vectors are available in one list, these two motion vectors are averaged even when they point to different reference pictures; if only one motion vector is available, that particular motion vector may be used directly; if no motion vector is available, keep this list invalid.

When the merge list is not full after pair-wise average merge candidates are added, zero MVPs are inserted in the end until the maximum merge candidate number is achieved.

Video encoder 200 or video decoder 300 may derive non-adjacent spatial candidates. In ECM, a new type of regular merge candidate, non-adjacent spatial merge candidates, is introduced. The non-adjacent spatial merge candidates as in JVET-L0399 are inserted after the temporal motion vector prediction (TMVP) in the regular merge candidate list.

Figure 6:
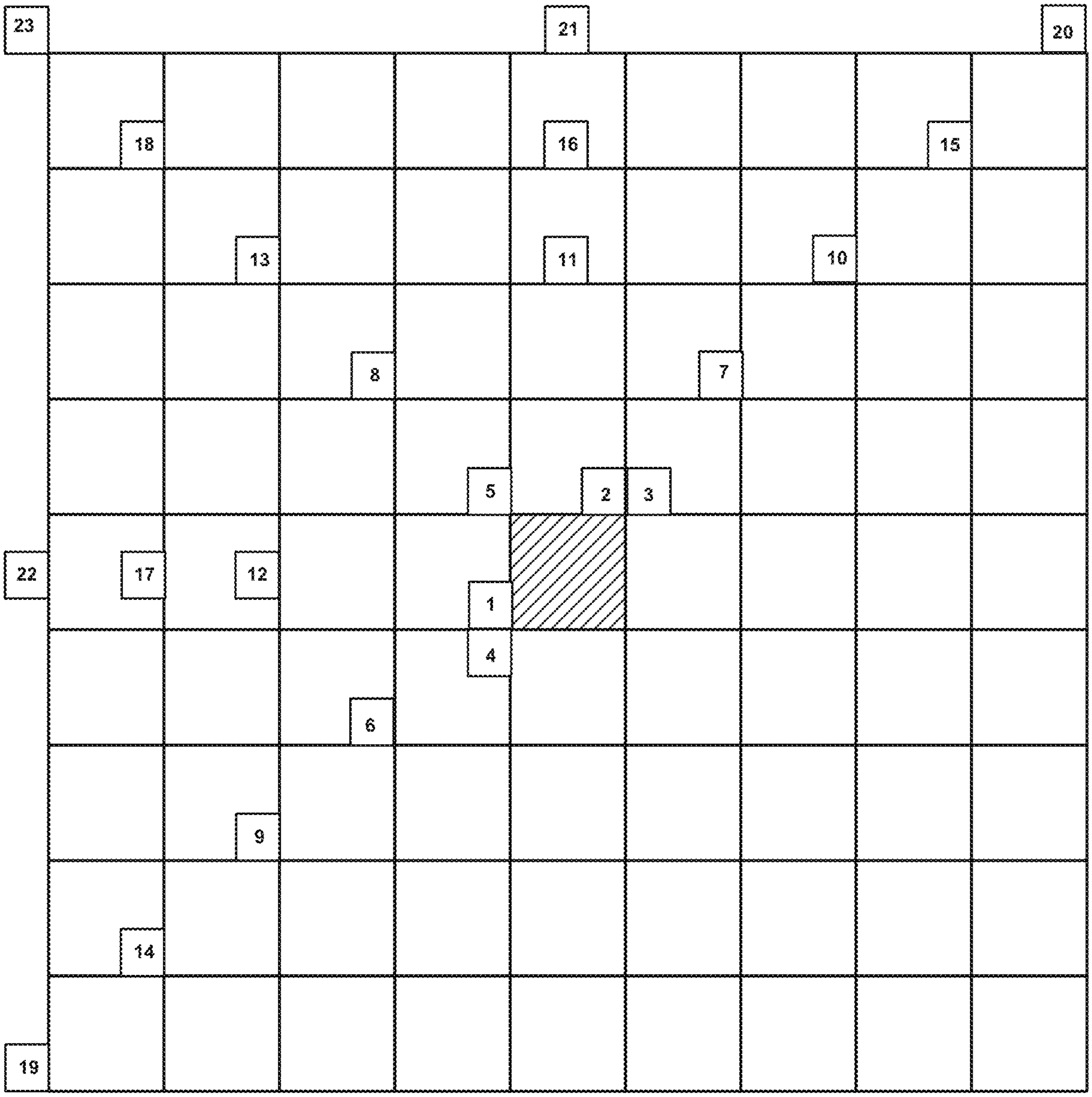
FIG. 6 is a conceptual diagram illustrating example spatial neighboring blocks used to derive the spatial merge candidates.

FIG. 6 is a conceptual diagram illustrating example spatial neighboring blocks used to derive the spatial merge candidates. The pattern of spatial merge candidates is shown in FIG. 6. The distances between non-adjacent spatial candidates and current coding block are based on the width and height of current coding block. The line buffer restriction is not applied.

Merge mode with motion vector differences (MMVD) is now described. In addition to merge mode (sometimes referred to as regular merge mode), where the implicitly derived motion information is directly used for prediction samples generation of the current CU, MMVD is introduced in VVC. In MMVD, after a merge candidate is selected, the merge candidate is further refined by signaled motion vector difference (MVD) information. The MVD information includes a merge candidate flag, an index to specify motion magnitude, and an index for indication of motion direction. In MMVD mode, one of the first two candidates in the merge list is selected to be used as a base MV. The merge candidate flag is signaled to specify which one of the first two candidates is used.

Figure 7:
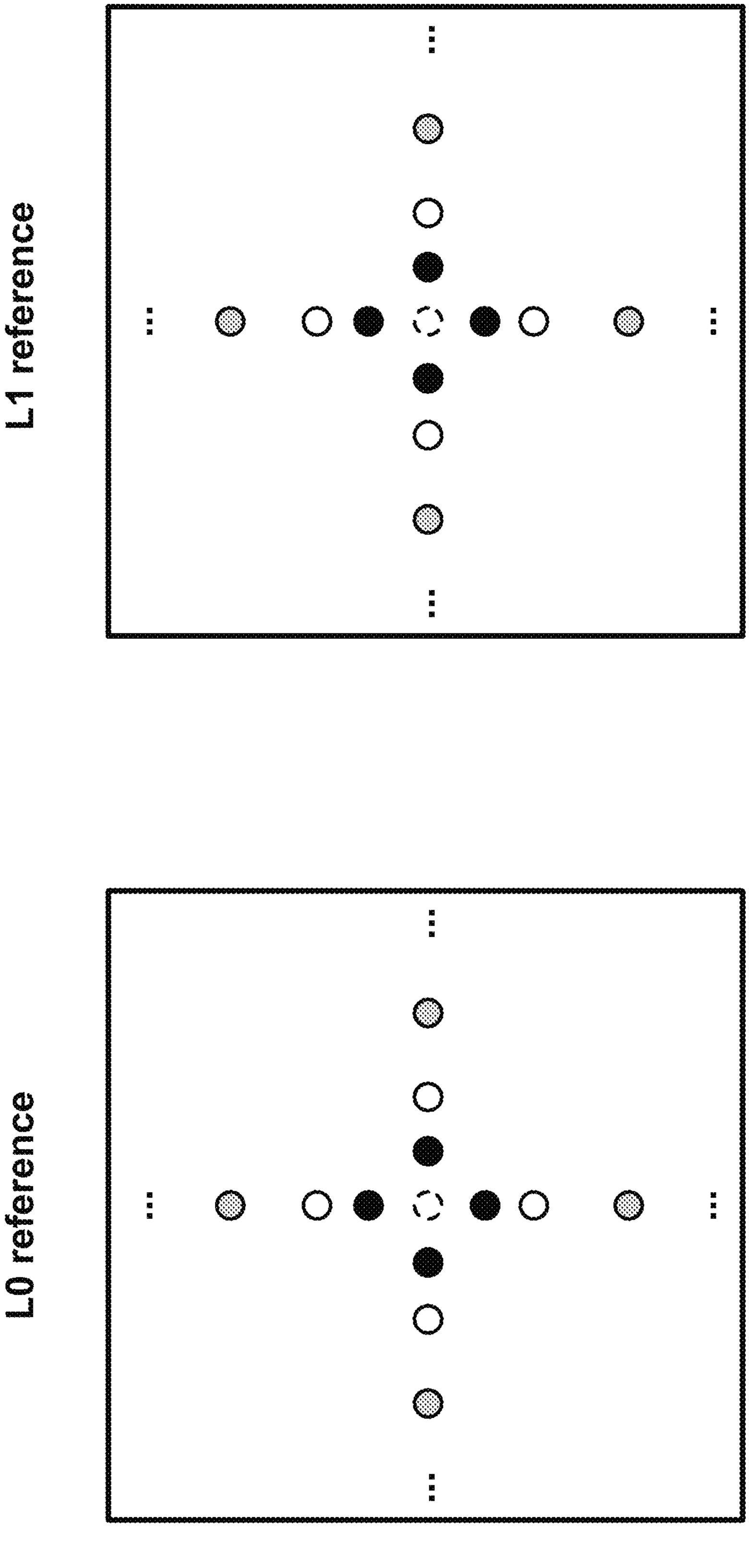
FIG. 7 is a conceptual diagram illustrating example MMVD search points.

FIG. 7 is a conceptual diagram illustrating example MMVD search points. The distance index specifies motion magnitude information and indicate the pre-defined offset from the starting point. As shown in FIG. 7, an offset is added to either horizontal component or vertical component of starting or base MV. The relation of distance index and pre-defined offset is specified in Table 1-1.

TABLE 1-1

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

The direction index represents the direction of the MVD relative to the starting point. The direction index can represent any of the four directions as shown in Table 1-2. It should be noted that the meaning of MVD sign may vary according to the information of a particular starting MV. When the starting MV is a uni-prediction MV or bi-prediction MVs with both lists pointing to the same side of the current picture (e.g. POCs of two references are both larger than the POC of the current picture, or are both smaller than the POC of the current picture), the sign in Table 1-2 specifies the sign of the MV offset added to the starting MV. When the starting MVs are bi-prediction MVs with the two MVs pointing to the different sides of the current picture (e.g. the POC of one reference is larger than the POC of the current picture, and the POC of the other reference is smaller than the POC of the current picture), the sign in Table 1-2 specifies the sign of the MV offset added to the list0 MV component of starting MV and the sign for the list1 MV has an opposite value.

TABLE 1-2

| Direction IDX | 00 | 01 | 10 | 11 |
|---|---|---|---|---|
| x-axis | + | − | N/A | N/A |
| y-axis | N/A | N/A | + | − |

In ECM, the number of directions is further increased from 4 to 8 to additionally include 4 diagonal directions.

Figure 8:
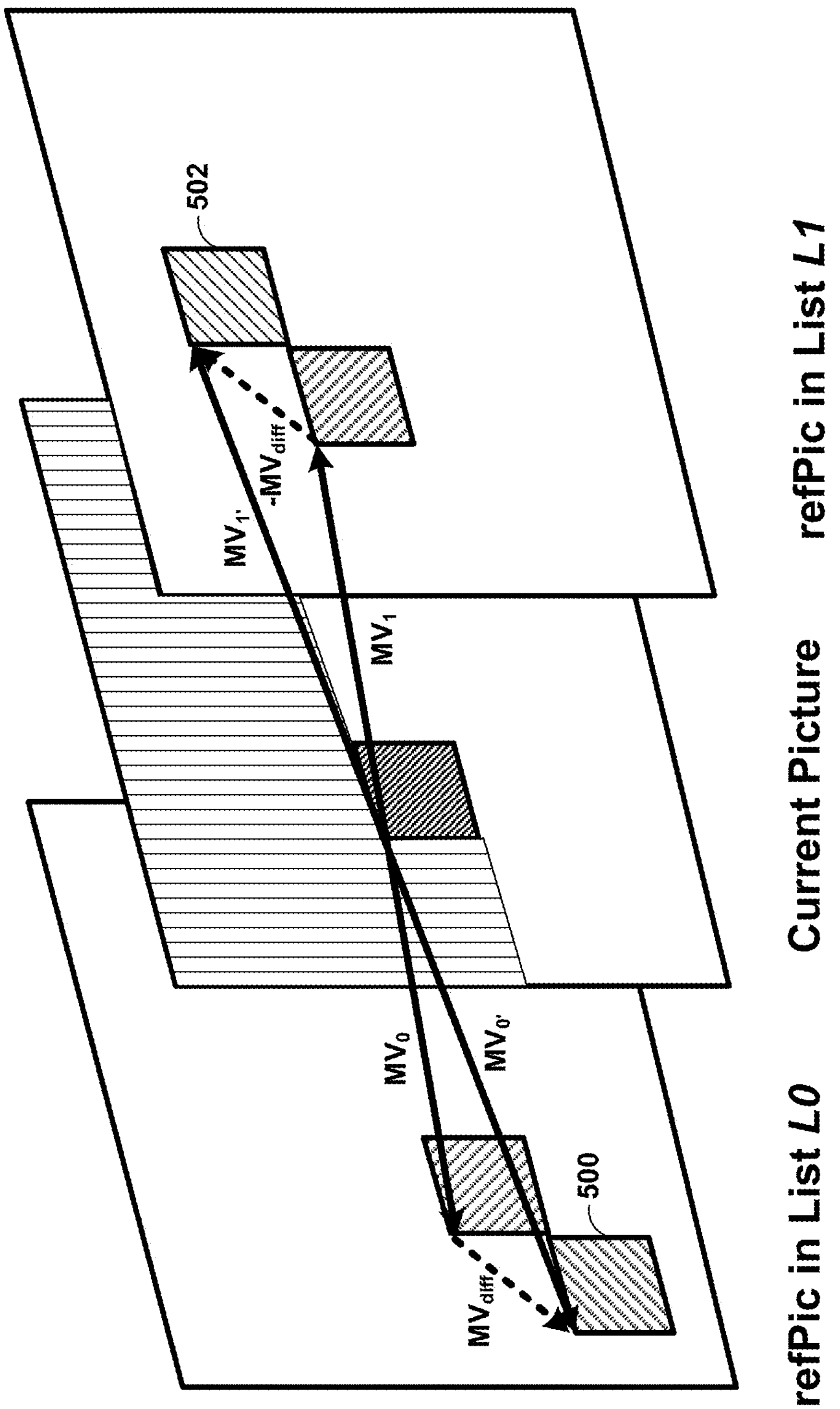
FIG. 8 is a conceptual diagram illustrating an example of bilateral matching.

FIG. 8 is a conceptual diagram illustrating an example of bilateral matching. Bilateral matching is now described. Video encoder 200 or video decoder 300 may apply bilateral matching. Bilateral matching is a technique that refines a pair of two initial motion vectors MV0 and MV1. Generally, bilateral matching involves video encoder 200 or video decoder 300 searching around the MV0 and MV1 to derive refined MVs MV0' and MV1' that minimizes the block matching cost. The block matching cost measures the similarity between the two motion compensated predictors generated by the two MVs (some typical criterions are: sum of absolute difference (SAD), sum of absolute transformed difference (SATD), sum of square error (SSE), et al) (e.g., between block 500 and block 502). The block matching cost may also include a regularization term that is derived based on the MV differences between the current MV pair and the initial MV pair. Certain constraints may also be applied to the MV differences between MVD0 (MV0'-MV0) and MVD1 (MV1'-MV1). Typically, video encoder 200 or video decoder 300 may assume that MVD0 and MVD1 are proportional to the temporal distances (TD) between the current picture and the reference pictures pointed by the two MVs. However, in some applications, video encoder 200 or video decoder 300 may assume that MVD0 is equal to −MVD1.

Decoder side motion vector refinement (DMVR) is now described. In some examples, DMVR may include sub-block offset-based affine DMVR refinement. In VVC, the bilateral-matching-based DMVR may be applied to increase the accuracy of the MVs of a bi-prediction merge candidate. The bilateral matching technique includes calculating the SAD between the two candidate blocks in the reference picture list L0 and list L1. As illustrated in FIG. 8, the SAD between block 500 and block 502 based on each MV candidate around the initial MV is calculated. The MV candidate with the lowest SAD becomes the refined MV and used to generate the bi-predicted signal. The SAD of the initial MVs is subtracted by ¼ of the SAD value to serve as a regularization term. The temporal distances (e.g., POC difference) from two reference pictures to the current picture is the same, therefore, the MVD0 is the opposite sign of MVD1.

The refinement search range is two integer luma samples from the initial MV. The searching includes an integer sample offset search stage and a fractional sample refinement stage. A twenty-five (25) points full search is applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage.

The integer sample search is followed by a fractional sample refinement. To lower calculational complexity, the fractional sample refinement is derived by using a parametric error surface equation instead of an additional search with an SAD comparison. The fractional sample refinement is conditionally invoked based on the output of the integer sample search stage. When the integer sample search stage is terminated with the center having the smallest SAD in either the first iteration or the second iteration search, the fractional sample refinement is further applied.

In parametric error surface-based sub-pixel offsets estimation, the center position cost and the costs at four neighboring positions from the center are used to fit a 2-D parabolic error surface equation of the following form:

$$E(x, y) = A(x - x_{min})^2 + B(y - y_{min})^2 + C \quad (1)$$

where ($x_{min}$, $y_{min}$) corresponds to the fractional position with the least cost and C corresponds to the minimum cost value. By solving the above equations by using the cost value of the five search points, the ($x_{min}$) $y_{min}$) is computed as:

$$x_{min} = (E(-1, 0) - E(1, 0))/(2(E(-1, 0) + E(1, 0) - 2E(0, 0))) \quad (2)$$

$$y_{min} = (E(0, 1) - E(0, 1))/(2((E(0, -1) + E(0, 1) - 2E(0, 0))) \quad (3)$$

The value of $x_{min}$ and $y_{min}$ are automatically constrained to be between −8 and 8 since all cost values are positive and the smallest value is E(0,0). This corresponds to half-pel offset with 1/16th-pel MV accuracy in VVC. The computed fractional ($x_{min}$, $y_{min}$) are added to the integer distance refinement MV to get the sub-pixel accurate refinement delta MV.

In VVC, the resolution of the MVs is 1/16 luma samples. The samples at the fractional position are interpolated using an 8-tap interpolation filter. In DMVR, the search points are surrounding the initial fractional-pel MV with integer sample offset. Therefore, the samples of those fractional position need to be interpolated for the DMVR search process. To reduce the calculation complexity, a bi-linear interpolation filter is used to generate the fractional samples for the searching process in DMVR. Another effect is that by using a bi-linear filter with a 2-sample search range, the DVMR process does not access more reference samples than during the normal motion compensation process. After the refined MV is attained with the DMVR search process, the normal 8-tap interpolation filter is applied to generate the final prediction. In order to not access more reference samples than the normal motion compensation process, the samples, which are not needed for the interpolation process based on the original MV, but are needed for the interpolation process based on the refined MV, may be padded from those available samples.

When the width and/or height of a CU are larger than 16 luma samples, the CU may be further split into subblocks with width and/or height equal to 16 luma samples for the DMVR process.

In VVC, DMVR can be applied for the CUs which are coded with following modes and features: 1) CU level merge mode with bi-prediction MV; 2) One reference picture is in the past and another reference picture is in the future with respect to the current picture; 3) The distances (e.g. POC difference) from two reference pictures to the current picture are same; 4) Both reference pictures are short-term reference pictures; 5) CU has more than 64 luma samples; 6) Both CU height and CU width are larger than or equal to 8 luma samples; 7) BCW weight index indicates equal weight; 8) WP is not enabled for the current block; and/or 9) combined inter-intra prediction (CIIP) mode is not used for the current block.

In ECM, the conditions are simplified: 1) CU level merge mode or AMVP-merge mode with bi-prediction MV; 2) One reference picture is in the past and another reference picture is in the future with respect to the current picture; 3) The distances (e.g. POC difference) from two reference pictures to the current picture are same; 4) MMVD mode is not used for the current block; 5) Both reference pictures are not scaled; 6) WP is not enabled for the current block; 7) CIIP mode is not used for the current block.

Figure 9:
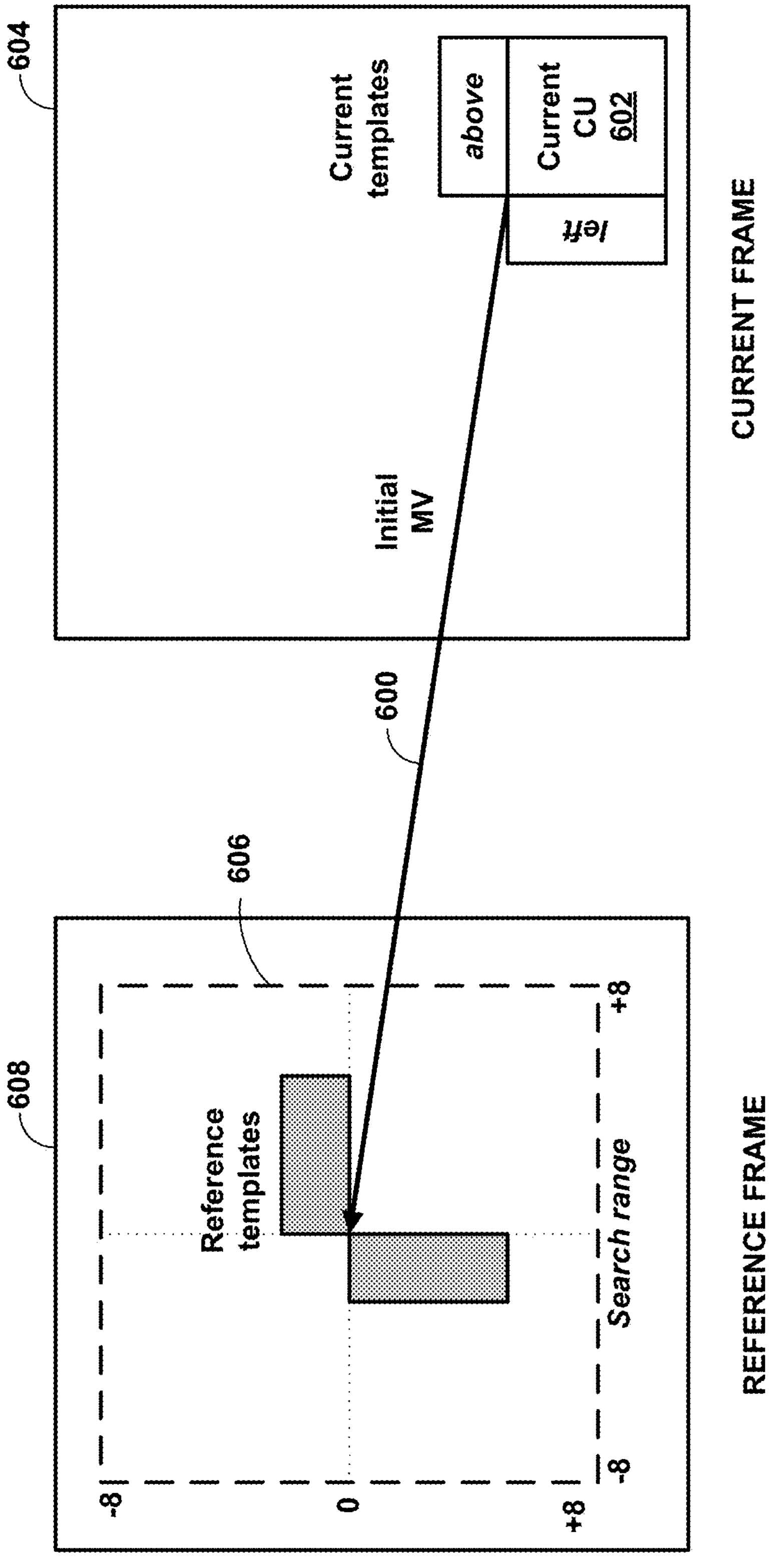
FIG. 9 is a conceptual diagram illustrating an example of template matching performed on a search area around an initial MV.

FIG. 9 is a conceptual diagram illustrating an example of template matching performed on a search area around an initial MV. Template matching merge mode is now described. Template matching (TM) is a decoder-side MV derivation technique to refine the motion information of the current CU by finding the closest match between a template (e.g., top and/or left neighboring blocks of the current CU) in the current picture and a block (e.g., a block the same size as the template) in a reference picture. As illustrated in FIG. 9, a better MV is to be searched around the initial motion vector 600 of the current CU 602 of current frame 604 within a [−8, +8]-pel search range 606 in reference frame 608. With an AMVP candidate selected based on initial matching error, its MVP is refined by template matching. With a merge candidate indicated by signaled merge index, its merged MVs corresponding to L0 and L1 are refined independently by template matching and then the less accurate motion vector is further refined again with the better motion vector as a prior.

As illustrated in FIG. 9, a better MV is searched around the initial motion of the current CU within a [−8, +8]-pel search range. The template matching technique in JVET-J0021 is used with the following modifications: search step size is determined based on AMVR mode and TM can be cascaded with the bilateral matching process in merge modes.

TM merge mode is a combination of regular merge mode and a template matching technique. A TM merge list is first constructed similar to regular merge mode except that the MVD threshold used for candidate pruning process is different. After the TM merge list is constructed, each candidate in the list may be further refined using the template matching technique. The refined motion vector may be signaled with a TM merge mode flag and a corresponding TM merge index.

Affine mode is now described. Video encoder 200 or video decoder 300 may use the affine mode. An affine motion model can be described as $$\begin{cases} v_x = ax + by + e \\ v_y = cx + dy + f \end{cases}$$

wherein ($v_x$, $v_y$) is the motion vector at the coordinate (x, y), and a, b, c, d, e, and f are the six affine parameters. This affine motion model may be referred to as 6-parameters affine motion model. In a typical video coder (e.g., video encoder 200 or video decoder 300), a picture is partitioned into blocks for block-based coding. The affine motion model for a block can also be described by the 3 motion vectors (MVs) $\vec{v}_0=(v_{0x}, v_{0y})$, $\vec{v}_1=(v_{1x}, v_{1y})$, and $\vec{v}_2=(v_{2x}, v_{2y})$ at 3 different locations that are not in the same line. The 3 locations are usually referred to as control-points, the 3 motion vectors are referred to as control-point motion vectors (CPMVs). In the case when the 3 control-points are at the 3 corners of the block, the affine motion can be described as $$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2x} - v_{0x})}{blkH}y + v_{0y} \end{cases}$$

wherein blkW and blkH are the width and height of the block.

In affine mode, different motion vectors can be derived for each pixel in the block according to the associate affine motion model. Therefore, motion compensation can be performed in a pixel-by-pixel manner. However, to reduce the complexity, subblock-based motion compensation is usually adopted or utilized, wherein the current block is partitioned into multiple subblocks (e.g., subblocks may have a smaller size than the current block) and each subblock is associated with one motion vector for block-based motion compensation. The motion vector for each subblock is derived using the representative coordinate of the subblock. Typically, the center position of the subblock is used. In one example, the block is partitioned into non-overlapping subblocks. The block width is blkW, block height is blkH, the subblock width is sbW and subblock height is sbH, then there's blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as $$\begin{cases} v_x = \frac{(v_{1x}-v_{0x})}{blkW}\left(j*sbW+\frac{sbW}{2}\right)+\frac{(v_{2x}-v_{0x})}{blkH}\left(i*sbH+\frac{sbH}{2}\right)+v_{0x} \\ v_y = \frac{(v_{1y}-v_{0y})}{blkW}\left(j*sbW+\frac{sbW}{2}\right)+\frac{(v_{2y}-v_{0y})}{blkH}\left(i*sbH+\frac{sbH}{2}\right)+v_{0y} \end{cases}$$

The subblock MVs are rounded to the predefined precision and stored in the motion buffer for motion compensation and motion vector prediction.

A simplified 4-parameters affine model (for zoom and rotational motion) is described as $$\begin{cases} v_x = ax - by + e \\ v_y = bx + ay + f \end{cases}$$

Similarly, the 4-parameters affine model for a block can be described by 2 CPMVs $\vec{v}_0=(v_{0x}, v_{0y})$ and $\vec{v}_1=(v_{1x}, v_{1y})$ at the 2 corners (typically top-left and top-right) of the block. The motion field is then described as $$\begin{cases} v_x = \frac{(v_{1x}-v_{0x})}{blkW}x - \frac{(v_{1y}-v_{0y})}{blkH}y + v_{0x} \\ v_y = \frac{(v_{1y}-v_{0y})}{blkW}x + \frac{(v_{1x}-v_{0x})}{blkH}y + v_{0y} \end{cases}$$

The subblock MV at $i_{th}$ row and $j_{th}$ column is derived as $$\begin{cases} v_x = \frac{(v_{1x}-v_{0x})}{blkW}\left(j*sbW+\frac{sbW}{2}\right)-\frac{(v_{1y}-v_{0y})}{blkW}\left(i*sbH+\frac{sbH}{2}\right)+v_{0x} \\ v_y = \frac{(v_{1y}-v_{0y})}{blkW}\left(j*sbW+\frac{sbW}{2}\right)+\frac{(v_{1x}-v_{0x})}{blkW}\left(i*sbH+\frac{sbH}{2}\right)+v_{0y} \end{cases}$$

Subblock-based temporal motion vector prediction (SbTMVP) is now described. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects. First, TMVP predicts motion at a CU level, but SbTMVP predicts motion at a sub-CU level. Second, whereas TMVP fetches the temporal motion vectors from the collocated block in the collocated picture (e.g., the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

A combined subblock-based merge list which contains both SbTVMP candidate and affine merge candidates is used for the signalling of subblock-based merge mode.

In ECM, to further improve the coding efficiency of SbTMVP, two aspects are modified. First, two collocated pictures are utilized which are the two reference frames with the least POC distance relative to the to-be-coded frame (e.g., the current frame). Secondly, the motion shift to locate the TMVP used for SbTMVP is adaptively determined from multiple locations according to template costs. More specifically, two motion shift candidate lists are constructed respectively for the two collocated frames. The motion shifts with the minimum template matching cost are used to derive SbTMVP or TMVP candidates. At most 4 SbTMVP candidates are included in the sub-block-based merge list. The SbTMVP candidate with the least template matching cost derived from the first collocated frame is placed in the first entry without reordering, while other SbTMVP candidates are sorted together with affine candidates. In addition, the prediction direction of each subblock template is determined based on the center subblock.

Figure 10:
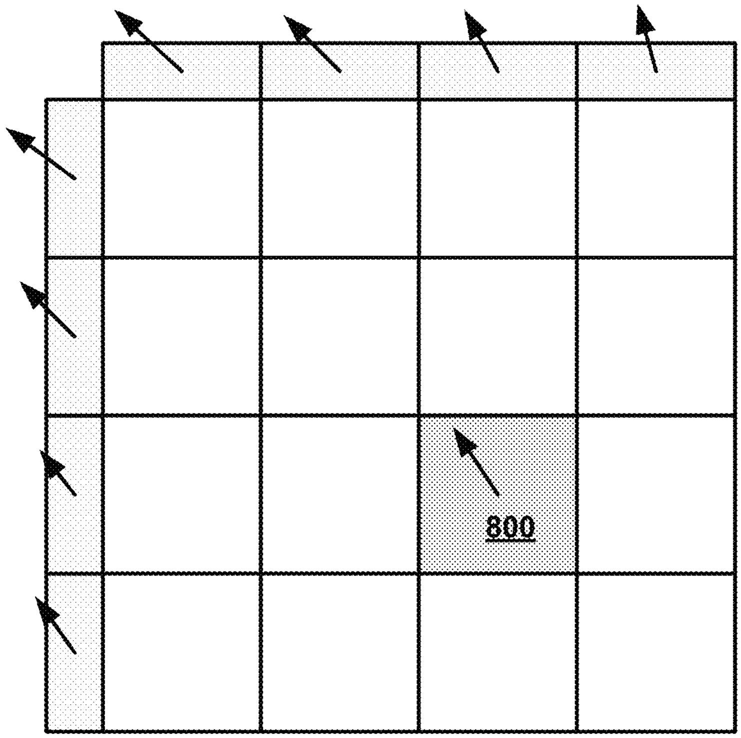
FIG. 10 is a conceptual diagram illustrating example subblock templates for generation of SbTMVP.

FIG. 10 is a conceptual diagram illustrating example subblock templates for generation of SbTMVP. As illustrated in FIG. 10, if the center subblock 800 is uni-predicted, then all the subblock templates are uni-predicted, and vice versa. If the motion vector of corresponding adjacent subblock at the determined reference list is not available for a subblock template, a zero MV is used for that subblock template.

Affine merge prediction is now described. Video encoder 200 or video decoder 300 may use an affine merge mode. In the affine merge mode, the CPMVs of the current CU are generated based on the motion information of the spatial neighboring CUs. There may be up to five CPMV candidates and an index is signalled to indicate which CPMV is to be used for the current CU. The following three types of CPVM candidate are used to form the affine merge candidate list: 1) inherited affine merge candidates that are extrapolated from the CPMVs of the neighbor CUs; 2) constructed affine merge candidates CPMVPs that are derived using the translational MVs of the neighbor CUs; and 3) zero MVs.

In ECM, three new types of merge candidates are introduced and the affine merge candidate list is constructed as follows: 1) SbTMVP candidates, if available; 2) inherited from adjacent neighbors; 3) regression-based affine merge candidates; 4) constructed affine candidates from adjacent neighbors; 5) constructed affine candidates from non-adjacent neighbors; 6) history-based affine merge candidates; and 7) zero MVs.

DMVR for affine merge mode is now described. Video encoder 200 or video decoder 300 may use DMVR for a bi-predicted affine merge candidate. For example, a translation MV offset is added to all the CPMVs of the candidate in the affine merge list if the candidate meets the DMVR condition. The MV offset is derived by minimizing the cost of bilateral matching, which is similar to conventional DMVR. The difference with using DMVR for a bi-predicted affine merge candidate is that the affine motion compensation is performed to generate predictors in both directions. The MV offset searching process is the same as the DMVR process (e.g., prediction unit level) in ECM. A 3×3 square search pattern is used to loop through the search range [−8, +8] in horizontal direction and [−8, +8] in vertical direction to find the best integer MV offset. Then a half pel search is conducted around the best integer position and an error surface estimation is performed to find an MV offset with 1/16 precision.

To calculate or determine the bilateral matching cost (for the given bi-directional affine motion), the following steps may apply: 1) the offset is first added to each of the CPMVs in both directions to update the CPMVs; 2) affine motion compensation is applied according to the updated CPMVs to generate the predictors in both directions; and 3) the distortion between the generated predictors is calculated using the predefined cost criterion.

Typically, the affine motion compensation is subblock based, wherein the current block is partitioned into non-overlapping subblocks. Regular motion compensation is performed for each of the subblocks (e.g., all samples in a particular subblock share the same motion). In VVC, prediction refinement with optical flow (PROF) may be applied after the subblock-based motion compensation to further improve the predictor.

In U.S. patent application Ser. No. 18/351,342, filed Jul. 12, 2023, a less complex and more practical DMVR design for affine motion model is disclosed. An example DMVR design can be summarized in the following steps: 1) divide the current block into subblocks; 2) generate initial motion vectors (of both prediction directions) for each subblock (e.g., subblock motion fields) according to the initial affine motion model; 3) loop over each subblock, calculate subblock bilateral matching cost for all possible offsets; 4) for each possible offset, accumulate the subblock bilateral matching cost to generate the bilateral matching cost corresponding to the entire block; and 5) determine the best offset by selecting the one with minimum bilateral matching cost corresponding to the entire block.

In U.S. patent application Ser. No. 18/467,513, filed Sep. 14, 2023, subblock skipping or subsampling is disclosed to further reduce complexity, wherein a subset of subblocks may be used during the affine DMVR process.

Regression-based DMVR for affine merge mode is now discussed. In ECM6.0, a linear regression-based affine merge candidate derivation technique proposed in JVET-AA0107 was adopted. In the proposal, a linear regression process is applied to derive the affine motion model, wherein the input to the linear regression is motion information and corresponding coordinates from a set of previously coded subblocks. Video encoder 200 or video decoder 300 may apply regression-based DMVR.

The objective of linear regression is to use the independent variables whose values are known to predict the value of the single dependent value which is unknown. Each predictor value is weighed, with the weights denoting their relative contribution to the overall prediction and added up or summed to form the prediction. A General model for multivariate linear regression is given by $Y=a+b_1X_1+b_2X_2+\ldots+b_nX_n$, wherein Y is the dependent variable, and $X_1, \ldots, X_n$ are the n independent variables. In calculating the weights $a, b_1, \ldots, b_n$, the least square technique is applied so that the mean square error between the statistical observation samples and the estimated value is minimized.

The affine motion model can be equivalently represented by two linear equations in matrix form as:

$$\begin{pmatrix} v_x \\ v_y \end{pmatrix} = \begin{pmatrix} a & b & e \\ c & d & f \end{pmatrix} \begin{pmatrix} x \\ y \\ 1 \end{pmatrix}$$

An affine motion model is essentially a linear equation of coordinates with certain coefficients.

Given a set of N subblocks with corresponding motion vectors $(v_x, v_y)$ and coordinates (x, y), the linear coefficients $$\begin{pmatrix} a & b & e \\ c & d & f \end{pmatrix}$$

can be solved by linear regression. Details of the linear regression process can be found in U.S. patent Ser. No. 18/188,908 filed on Mar. 23, 2023, and in JVET-O0066.

As described in section above, during the sub-block offset-based affine DMVR process, the BM cost is computed per sub-block for all possible motion vector offsets. Therefore, it is possible to decide the best sub-block motion vector offset for each of the sub-blocks independently and in parallel to decide the global offset for all CPMVs. With the refined motion vectors $(v_x, v_y)$ and the corresponding coordinates (x, y), linear regression can be applied to derive a new set of CPMVs as the refined affine merge candidate. A detailed process which video encoder 200 or video decoder 300 may implement is as follows: 1) a coding block is partition into subblocks, and corresponding initial subblock MVs are generated (e.g., typically from the initial motion information for the coding block); 2) bilateral matching is performed for each of the subblocks to generate a set of refined MVs; and 3) the refined MVs and the corresponding coordinates of those subblocks are used as input for the linear regression process, the output of the linear regression is the derived affine motion model.

Figure 11:
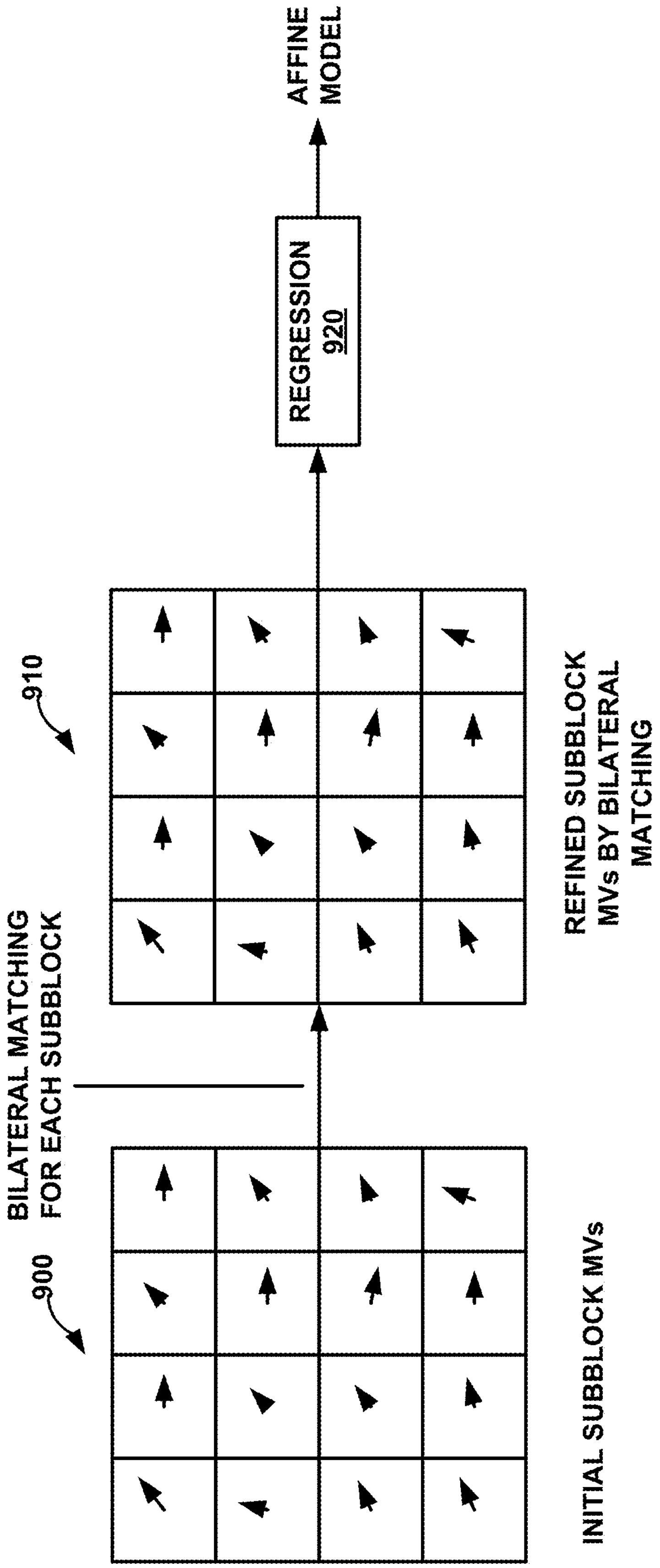
FIG. 11 is a conceptual diagram illustrating example regression-based decoder sign affine derivation techniques.

FIG. 11 is a conceptual diagram illustrating example regression-based decoder sign affine derivation techniques. The affine DMVR regression process is illustrated in FIG. 11. For example, video encoder 200 or video decoder 300 may determine initial subblock MVs for the subblock of block 900. Video encoder 200 or video decoder 300 may apply bilateral matching for the subblocks to determine refined subblock MVs as depicted in block 910. Video encoder 200 or video decoder 300 may apply linear regression 920 using the refined subblock MVs, as described above, to generate the affine model.

Affine model parameters refinement with affine DMVR is now described. As introduced above, an affine motion model can be described as $$\begin{cases} v_x = ax + by + e \\ v_y = cx + dy + f \end{cases}$$

The affine parameters are derived from the CPMVs as follows:

$$\begin{cases} a = \dfrac{mv_{1x} - mv_{0x}}{\text{width}} \\ b = \dfrac{mv_{2x} - mv_{0x}}{\text{height}} \\ c = \dfrac{mv_{1y} - mv_{0y}}{\text{width}} \\ d = \dfrac{mv_{2y} - mv_{0y}}{\text{height}} \end{cases}$$

When the affine merge candidates are refined in the way as described in section above where the same offset is being added to all the CPMVs, only the translational affine parameter e and f will be refined and the other non-translational affine parameters a, b, c and d remain unchanged. In this section, the affine model parameters refinement is refined with affine DMVR as follows and video encoder 200 or video decoder 300 may implement such affine model parameters refinement.

Figure 12C:
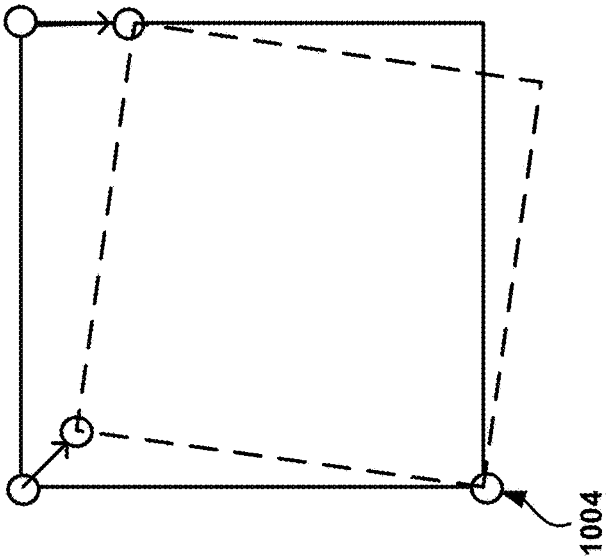
FIGS. 12A-C are conceptual diagrams illustrating an example of three stages of non-translation affine parameters search.
Figure 12B:
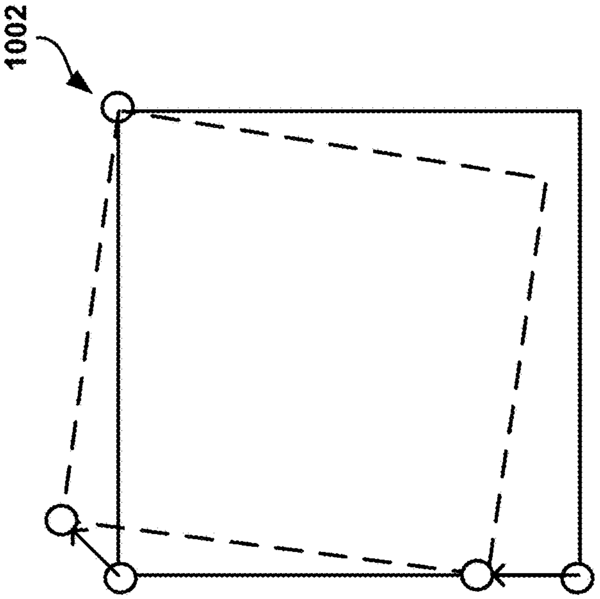
Figure 12A:
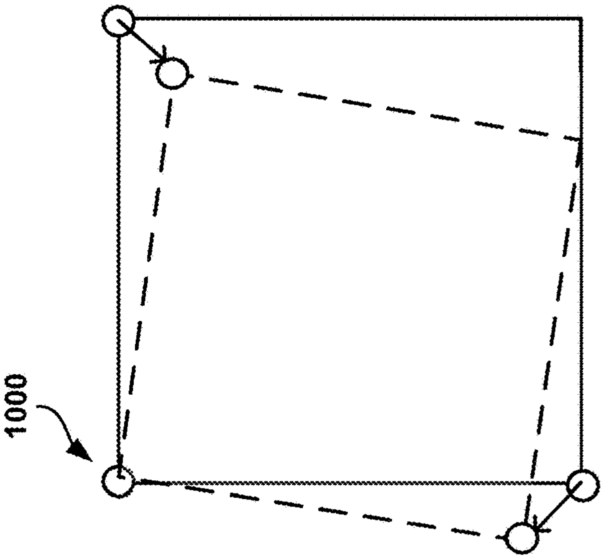

FIGS. 12A-C are conceptual diagrams illustrating an example of three stages of non-translation affine parameters search. The search process has three stages. In the first stage as shown in FIG. 12A, the top-left CPMV 1000 is fixed or selected as a base MV of the affine model and the parameters a, b, c and d are jointly searched with a cross pattern to find values that minimize the cost of bilateral matching. Then CPMVs are recalculated with the refined parameter values of a, b, c and d. In the second stage as shown in FIG. 12B, the new top-right CPMV 1002 is fixed or selected as the base MV and the parameters a, b, c and d are jointly searched again to find new values that minimize the cost of bilateral matching, and CPMVs are recalculated again after the search. In the third stage as shown in FIG. 12C, the new left-bottom CPMV 1004 is fixed or selected as the base MV and the same search process is applied on parameters a, b, c and d once again to obtain the final refined model. For 4-parameter affine model, only parameters a and b need to be refined and the search process itself is the same as that for 6-parameter affine model. For each search point in the search process, motion compensation may be applied for the whole CU and the SAD between two predictors of the CU may be used as the cost.

Figure 13:
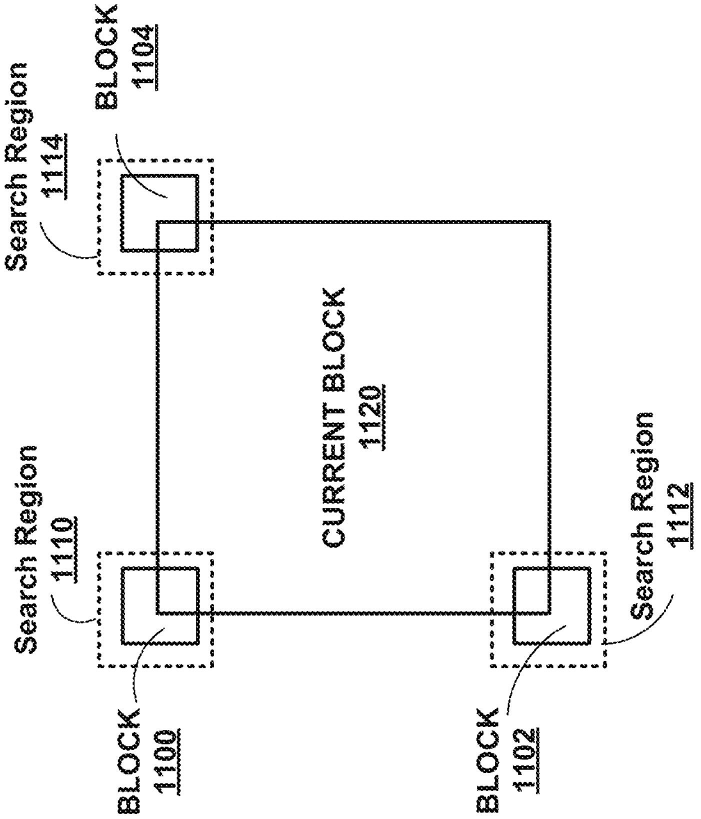
FIG. 13 is a conceptual diagram illustrating an example independent search for CPMVs.

FIG. 13 is a conceptual diagram illustrating an example independent search for CPMVs. Affine DMVR CPMV search is now discussed. Video encoder 200 or video decoder 300 may implement an affine DMVR CPMV search. In affine DMVR CPMV searching, each CPMV may be independently refined by regular DMVR (e.g., bilateral matching) of a representative block. As illustrated in FIG. 13, each CPMV is searched within a predefined search area based on bilateral matching of the representative identified block (e.g., block, block 1, block 2). For example, video encoder 200 or video decoder 300 may apply an affine DMVR CPMV search for current block 1120. The representative block can be a block that contains the CPMV location. For example, block 1100 may include a CPMV location, block 1102 may include a CPMV location, and block 1104 may include a CPMV location. Search region 1110 may represent a search region for block 1100, search region 1112 may represent a search region for block 1102, and search region 1114 may represent a search region for block 1104.

For example, the representative block can be a block that has the CPMV location as its center, e.g., the coordinates of the top-left sample of the block is (xk-halfDx, yk-halfDy), wherein (xk, yk) is the coordinate of the CPMV, and halfDx is half the width of the block and halfDy is half the height of the block. Examples of halfDx and halfDy: 2, 4, 8, et al. An upper bound threshold may be set for halfDx and halfDy, for example 8, to limit the size of the block that is being used in the regular DMVR search.

The input and output of the process are the CPMVs of both prediction directions, denoted as mvAffineInit[i][k] and mvAffineBest[i][k], wherein i=0, 1 represents the index of prediction direction, and k=0, 1, 2 represents the index of the CPMV. The following applies for k=0, 1, 2:

Video encoder 200 or video decoder 300 may perform regular DMVR for the representative block k (e.g., block 1100, block 1102, block 1104) using mvAffineInit[i][k], i=0, 1 as input and the output is cpmv[i][k]. cpmv[0][k]=mvAffineInit[0][k]+mvOffset[k], cpmv[1][k]=mvAffineInit[1][k]−mvOffset[k].

After each CPMV is refined independently, both mvAffineInit[i][k] and cpmv[i][k] are used as candidates for the CPMV k, the mvAffineBest[i][k] is set equal to the best combination of those candidates that generate the minimum bilateral matching cost for the current block. The following pseudo code is an example of the process:

Set cpmvCand [i][k][0]=mvAffineInit[i][k], and cpmvCand [i][k][1]=cpmv[i][k], for all i=0, 1 and k=0, 1, 2.

Set minCost equal to a predefined maximum value (max 64 bits integer value for example)

```
Loop cpmvIdx0 from 0 to 1
  Loop cpmvIdx1 from 0 to 1
    Loop cpmvIdx2 from 0 to 1
      cpmvTemp[i][0] is set equal to
    cpmvCand[i][0][cpmvIdx0] for i = 0, 1
      cpmvTemp[i][1] is set equal to
    cpmvCand[i][1][cpmvIdx1] for i = 0, 1
      cpmvTemp[i][2] is set equal to
    cpmvCand[i][2][cpmvIdx2] for i = 0, 1
      Calculate bilateral matching cost, denoted as costTemp, for
    the current block (e.g., current block 1120) using cpmvTemp[i][k],
    i = 0, 1, k = 0, 1, 2.
      If costTemp is less than minCost
        minCost is set equal to costTemp, and
        mvAffineBest[i][k] is equal cpmvTemp[i][k], i = 0,
        1, k = 0, 1, 2
```

Multi-pass decoder-side motion vector refinement in ECM is now discussed. Video encoder 200 or video decoder 300 may apply a multi-pass decoder-side motion vector refinement. In the first pass, bilateral matching (BM) is applied to the coding block. In the second pass, BM is applied to each 16×16 subblock within the coding block. In the third pass, a MV in each 8×8 subblock is refined by applying bi-directional optical flow (BDOF). The refined MVs are stored for both spatial and temporal motion vector prediction.

In the first pass, a refined MV is derived by applying BM to a coding block. Similar to DMVR, in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

Video encoder 200 or video decoder 300 implementing bilateral matching may perform a local search to derive an integer sample precision intDeltaMV. The local search applies a 3×3 square search pattern to loop through the search range [−sHor, sHor] in the horizontal direction and [−sVer, sVer] in the vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, a mean removed sum of absolute differences (MRSAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and video encoder 200 or video decoder 300 continues to search for the minimum cost, until video encoder 200 or video decoder 300 reaches the end of the search range.

The existing fractional sample refinement is further applied to derive the final deltaMV. The refined MVs after the first pass is then derived as:

$$\mathrm{MV0\_pass1} = MV0 + deltaMV$$

$$\mathrm{MV1\_pass1} = MV1 - deltaMV$$

In the second pass, a refined MV is derived by applying bilateral matching to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2 (sbIdx2)) are derived based on the minimum bilateral matching cost between the two reference subblocks in L0 and L1.

For each subblock, video encoder 200 or video decoder 300 implementing bilateral matching performs a full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 14:
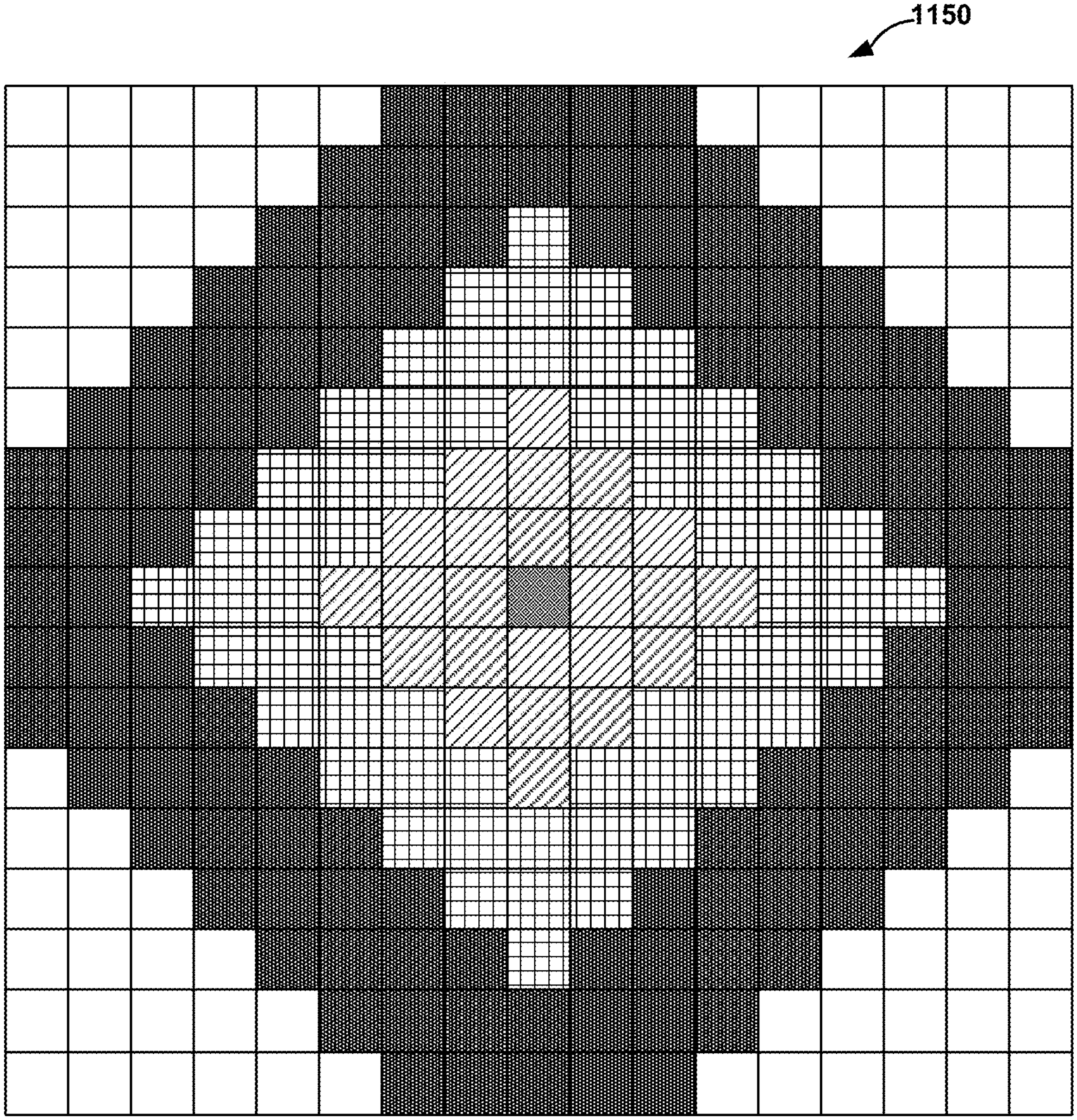
FIG. 14 is a conceptual diagram illustrating example diamond regions in a search area.

FIG. 14 is a conceptual diagram illustrating example diamond regions in a search area. The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions in search area 1150 as shown on FIG. 14. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV (sbIdx2). The refined MVs at second pass is then derived as:

$$\text{MV0\_pass2}(sbIdx2) = \text{MV0\_pass1} + deltaMV(sbIdx2)$$

$$\text{MV1\_pass2}(sbIdx2) = \text{MV1\_pass1} + deltaMV(sbIdx2)$$

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

The refined MVs (MV0_pass3 (sbIdx3) and MV1_pass3 (sbIdx3)) at third pass are derived as:

$$MV0\_\text{pass3}(sbIdx3) = MV0\_\text{pass2}(sbIdx2) + bioMv$$

$$MV1\_\text{pass3}(sbIdx3) = MV0\_\text{pass2}(sbIdx2) - bioMv$$

Bi-directional optical flow (BDOF) is now described. BDOF is used to refine the bi-prediction signal of luma samples in a CU at the 4×4 sub-block level. For example, video encoder 200 or video decoder 300 may use BDOF to refine the bi-prediction signal of luma samples in a CU at the 4×4 sub-block level. BDOF is based on the optical flow concept, which assumes that the motion of an object is smooth. For each 4×4 sub-block, a motion refinement (Vx, Vy) is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j),\ k=0,1,$$

of the two prediction signals are computed by directly calculating the difference between two neighboring samples, e.g., $$\frac{\partial I^{(k)}}{\partial x}(i,j) = \left(I^{(k)}(i+1,j) \gg \text{shift1}\right) - \left(I^{(k)}(i-1,j) \gg \text{shift1}\right) \quad (1\text{-}6\text{-}1)$$

$$\frac{\partial I^{(k)}}{\partial y}(i,j) = \left(I^{(k)}(i,j+1) \gg \text{shift1}\right) - \left(I^{(k)}(i,j-1) \gg \text{shift1}\right)$$

where $I^{(k)}(i, j)$ are the sample value at coordinate (i, j) of the prediction signal in list k, k=0,1, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as $$S_1 = \sum_{(i,j)\in\Omega} |\psi_x(i,j)|,\ S_3 = \sum_{(i,j)\in\Omega} \theta(i,j)\cdot(-\text{sign}(\psi_x(i,j))) \quad (1\text{-}6\text{-}2)$$

$$S_2 = \sum_{(i,j)\in\Omega} \psi_x(i,j)\cdot\text{sign}(\psi_y(i,j))$$

$$S_5 = \sum_{(i,j)\in\Omega} |\psi_y(i,j)|\ \ S_6 = \sum_{(i,j)\in\Omega} \theta(i,j)\cdot(-\text{sign}(\psi_y(i,j)))$$

where $$\psi_x(i,j) = \left(\frac{\partial I^{(1)}}{\partial x}(i,j) + \frac{\partial I^{(0)}}{\partial x}(i,j)\right) \gg \text{shift3} \quad (1\text{-}6\text{-}3)$$

$$\psi_y(i,j) = \left(\frac{\partial I^{(1)}}{\partial y}(i,j) + \frac{\partial I^{(0)}}{\partial y}(i,j)\right) \gg \text{shift3}$$

$$\theta(i,j) = \left(I^{(0)}(i,j) \gg \text{shift2}\right) - \left(I^{(1)}(i,j) \gg \text{shift2}\right)$$

where Ω is a 6×6 window around the 4×4 sub-block, the value of shift2 is set to be equal to 4, and the value of shift3 is set to be equal to 1.

The motion refinement ($v_x$, $v_y$) is then derived using the cross- and auto-correlation terms using the following:

$$v_x = S_1 > 0?\ \text{clip3}(-th'_{BIO}, th'_{BIO}, -((S_3 \ll 2) \gg \lfloor \log_2 S_1 \rfloor)) : 0 \quad (1\text{-}6\text{-}4)$$

$$v_y = S_5 > 0?\ \text{clip3}(-th'_{BIO}, th'_{BIO}, -((S_6 \ll 2) - ((v_x \cdot S_2) \gg 1)) \gg \lfloor \log_2 S_5 \rfloor)) : 0$$

Where, $th'_{BIO}$=1<<4. [.] is the floor function.

Based on the motion refinement and the gradients, the following adjustment is calculated for each sample in the 4×4 sub-block:

$$b(x, y) = v_x \cdot \left( \frac{\partial I^{(1)}(x, y)}{\partial x} - \frac{\partial I^{(0)}(x, y)}{\partial x} \right) + v_y \cdot \left( \frac{\partial I^{(1)}(x, y)}{\partial y} - \frac{\partial I^{(0)}(x, y)}{\partial y} \right) \quad (1\text{-}6\text{-}5)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) \gg shift5 \quad (1\text{-}6\text{-}6)$$

Wherein, shift5 is set equal to Max (3, 15−BitDepth) and the variable $o_{offset}$ is set equal to (1<< (shift5−1)).

These values are selected such that the multipliers in the BDOF process do not exceed 15-bits, and the maximum bit-width of the intermediate parameters in the BDOF process is kept within 32-bits.

Figure 15:
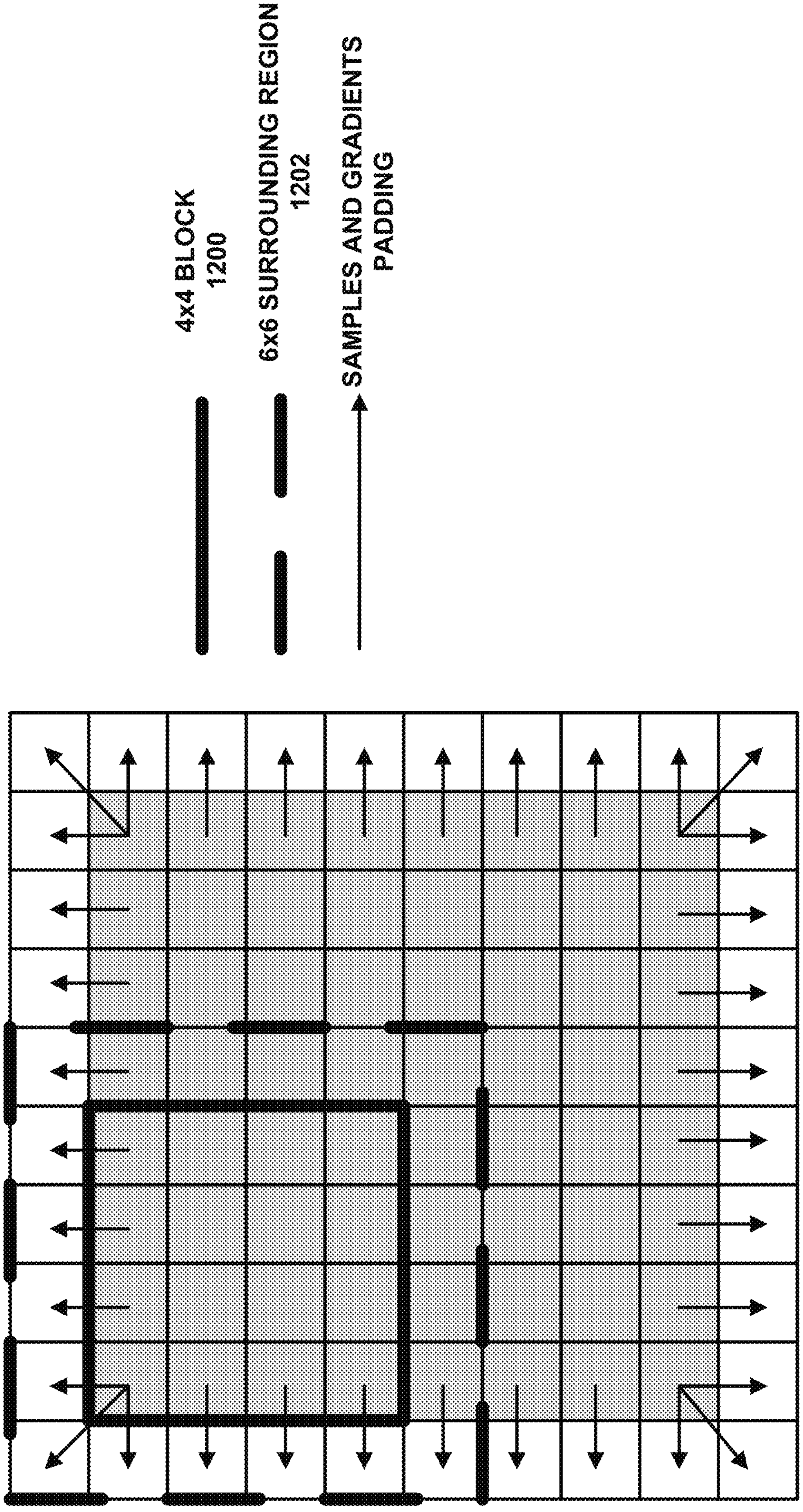
FIG. 15 is a conceptual diagram illustrating an example extended CU region used in BDOF.

FIG. 15 is a conceptual diagram illustrating an example extended CU region used in BDOF. As depicted in FIG. 15, the BDOF process uses one extended row and column around the CU's boundaries. In FIG. 15, the CU is shown as 4×4 block 1200, and the one extended row and column is shown as 6×6 surrounding region 1202. In order to control the computational complexity of generating the out-of-boundary prediction samples, prediction samples in the extended area (white positions) are generated by taking the reference samples at the nearby integer positions (using floor ( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, then those values are padded (e.g., repeated) from nearest neighbors.

Video encoder 200 and video decoder 300 may use a BDOF process to refine the bi-prediction signal of a CU at the 4×4 subblock level. BDOF may be applied to a CU if the CU satisfies all the following conditions: 1) the CU is coded using "true" bi-prediction mode, e.g., one of the two reference pictures is prior to the current picture in display order and the other is after the current picture in display order; 2) the CU is not coded using affine mode or the ATMVP merge mode; 3) the CU has more than 64 luma samples; 4) both CU height and CU width are larger than or equal to 8 luma samples; 5) a BCW weight index indicates equal weight; 6) WP is not enabled for the current CU; and 7) CIIP mode is not used for the current CU.

In JVET-AE0065, a technique of "Iterative BDOF pass in multi-pass DMVR" was proposed and included in ECM. The technique includes extending the multi-pass DMVR by adding a $4^{th}$ BDOF MV refinement pass. In the extended technique, the maximum subblock size of the $3^{rd}$ BDOF MV refinement pass is always 8×8, and maximum subblock size of the $4^{th}$ BDOF MV refinement pass is adaptively set to 4×4 when the coding block size is smaller than 1024 and 8×8 otherwise. When the subblock in the $3^{rd}$ BDOF MV refinement pass derives a delta motion with Vx is equal to 0 and Vy is equal to 0, the $4^{th}$ BDOF MV refinement pass is skipped.

Currently in ECM, for merge mode, the LIC flag and BCW index are always inherited from neighboring blocks. For example, for a current block, video decoder 300 may inherit the LIC flag and BCW index from a neighboring block. However, this may not be an optimal solution because illumination changes may occur in the neighboring blocks, but not in the current block or vice versa. To solve this problem, techniques are described herein for deriving the LIC flags and/or BCW indices for merge mode. Considering the vast variety of different merge modes and the applicability of LIC to these merge modes, the interaction between the LIC flag and regular merge mode, TM merge mode, and affine merge mode are described herein.

The disclosed techniques may be used solely (e.g., separately) or in any combination.

In some examples, video encoder 200 or video decoder 300 may always disable LIC for merge mode. Since LIC can be applied not only to merge mode, but also to AMVP mode, there is already an option to turn on or off the LIC technique in AMVP mode. Therefore, for merge mode, to reduce both the encoding and decoding complexity, the LIC flag can always be set to false regardless of the LIC flag value of the neighboring blocks.

In other examples, video encoder 200 or video decoder 300 may always enable LIC for merge mode. When performing LIC, the template of the current block and a template of a reference block may be used as the input to derive a scaling factor and an offset through a mean square error (MSE) minimization process. If no illumination changes are happening between the current template and reference template, the scaling factor and offset may be close to 1 and 0 respectively, such that even if video encoder 200 or video decoder 300 were to apply the derived LIC mode, there may be almost no influence on the motion compensation result compared to the case where LIC is not applied. However, when there is an illumination change between the current template and reference template, the derived LIC model may help to improve the motion compensation result which may be beneficial. Hence, for merge mode, the LIC flag may be set to true regardless of the LIC flag value of the neighboring blocks.

In some examples, video encoder 200 may signal a LIC flag for merge mode. In such examples, video decoder 300 may obtain the LIC flag in a bitstream and parse the LIC flag to determine whether the LIC flag is true or false (e.g., has a value equal to 1 or 0). Because the LIC model may be derived based on the current template and reference template and applied to the current coding block, the LIC model may not be accurate because the templates may not be a good representation of the current and reference block. Therefore, another option is to signal the LIC flag for merge mode and let the encoder use rate distortion (RD) techniques to decide the LIC flag value instead of video encoder 200 or video decoder 300 inheriting the LIC flag from the neighboring blocks. For example, video encoder 200 may use RD to determine a LIC flag value and signal that LIC flag value in a bitstream to video decoder 300.

In one example, a separate flag is used to indicate if the LIC flag is always on or off for a merge mode, e.g., regardless of the LIC flag value of the neighboring block. For example, video encoder 200 may signal this separate flag in a bitstream and video decoder 300 may obtain the flag in the bitstream and parse the flag to determine whether the LIC flag is always on or off for the merge mode.

In another technique, the separate flag is used to indicate whether the inherited LIC flag is reversed. Therefore, the final LIC flag is determined by the inherited flag and the signaled flag together. For example, the final LIC flag is true if the inherited flag is not equal to the signaled flag, otherwise the final LIC flag is false.

In some examples, video decoder 300 may determine to decode a current block of the video data using a merge mode. Video decoder 300 may obtain a flag from a bitstream. Video decoder 300 may determine, based on a value of the flag, to use a second merge list of two merge lists for the current block. The second merge list is based on the first merge list of the two merge lists. Video decoder 300 may decode the current block based on the second merge list.

For example, for merge mode, to signal the LIC flag for example for regular merge mode, a second regular merge list may be created, for example, by copying the original regular merge list and inverting the LIC flag value of each entry because one of the LIC flag variants may be tried in the merge mode. As used herein, inverting or flipping a LIC flag value means changing the LIC flag value to an opposite value, such as from true to false, false to true, 1 to 0, 0 to 1, etc. For example, video decoder 300 may generate the first merge list (e.g., the original regular merge list) including determining a plurality of merge candidates, each of the plurality of merge candidates in the first merge list having a respective LIC flag value inherited from a respective neighboring block. Video decoder 300 may also generate the second merge list including copying the plurality of merge candidates from the first merge list to the second merge list and changing a respective LIC flag value for each of the plurality of merge candidates to an opposite value.

The new regular merge list may go through the SATD and RD stage to compete with other existing merge modes. When regular merge mode is selected, an additional mode flag may be signaled by video encoder 200 to video decoder 300 to indicate if the original regular merge list or the new regular merge list is used. For example, video encoder 200 may signal the additional mode flag in a bitstream to video decoder 300 to indicate whether to use the original regular merge list or the new regular merge list. Video decoder 300 may parse the additional mode flag to determine a value of the additional mode flag indicative of which of the two merge lists to use. In some examples, video decoder 300 may generate a first merge list (e.g., a regular merge list) and generate a second merge list (e.g., the new regular merge list) based on the first merge list. For other merge mode related techniques, for example TM merge mode and/or affine merge mode, a similar scheme may be used to that set forth for regular merge mode to signal the LIC flag that should be used. In one example, in one merge list all the LIC flags may be set to false without inheritance and for the other merge list all the LIC flag may be set to true.

For affine merge mode, not only affine merge candidates, but also SbTMVP merge candidates, may be included in the list. For example, video encoder 200 or video decoder 300 may include both SbTMVP merge candidates and affine merge candidates in the candidate list. For example, the first merge list may include a plurality of candidates, wherein the plurality of candidates include at least one affine merge candidate and at least one SbTMVP candidate. Since SbTMVP and affine merge candidates are quite different, it may be reasonable to exclude SbTMVP candidates from the LIC flag signaling. In one example, when constructing the new affine merge list (e.g., similar to or related to the example with the signaled LIC flag), before copying the original affine merge list and inverting the LIC flag, the SbTMVP candidates are excluded from the process. For example, video decoder 300 may generate the second merge list based on the first merge list including copying the plurality of candidates from the first merge list to the second merge list and inverting a respective LIC flag for each respective of the plurality of candidates in the second merge list, and excluding the least one SbTMVP candidate such that the second merge list does not include the at least one SbTMVP candidate. In another example, the SbTMVP candidates may be replaced by other affine merge candidates which are not yet inserted into the list due to list size limitations. For example, as part of generating the second merge list, video decoder 300 may replace the at least one SbTMVP candidate with at least one other affine merge candidate.

In another example, when the LIC flag is signaled, the candidate list for the mode may be derived differently from the regular merge candidate list. In one example, only the first several candidates of the regular merge candidates may be used to generate the candidate list. For example, video encoder 200 or video decoder 300 may use a subset of the regular merge candidates for the candidate list when the LIC flag is signaled.

In some examples, video decoder 300 may determine to decode a current block of the video data using a merge mode. Video decoder 300 may generate a first merge list for the current block, wherein generating the first merge list comprises applying template matching to candidates of the first merge list. Video decoder 300 may generate, based on the first merge list, a second merge list. Video decoder 300 may decode the current block using the merge mode and based on the first merge list or the second merge list. For example, when the LIC flag is signaled as a value equal to true, the second candidate list for the mode is derived with all inherited LIC flag(s) flipped or inverted from the regular candidate list, and is trimmed before or after template matching cost-based reordering (e.g., adaptive reordering of merge candidates (ARMC) or as discussed hereinafter). In some examples, as part of generating the second merge list, video decoder 300 may, prior to applying template matching to the candidates of the first merge list, trim candidates of the first merge list for the second merge list. In some examples, video decoder 300 may, after applying template matching to the candidates of the first merge list, trim the plurality of merge candidates in the second merge list. For example, when video encoder 200 signals the LIC flag, video decoder 300 may derive the candidate list by changing inherited LIC flag(s) from the regular candidate list, for example, from 1 to 0 and/or from 0 to 1. When generating the candidate list, all the candidates are not necessarily used. In one example, only the first N candidates from the regular merge list are used. The candidate list generation can also occur after template matching cost-based reordering. In one example, only the first N candidate(s) after an ARMC process will be used to generate the new merge list. For example, video decoder 300 may trim the candidate list.

When flipping the LIC flag, instead of simply flipping or inverting the LIC flag from true to false or from false to true, there may be more options because, in some examples, multiple sets of LIC parameter may be stored in the neighbor CUs, from which the original merge candidate is derived, as described above.

When the original merge candidate has a LIC flag equal to false, instead of flipping the LIC flag from false to true and deriving the LIC parameter set using the template of current block and the template of the reference block, there could also be a set of LIC parameters derived using the NLIC technique and stored in the corresponding neighboring CU. Therefore, another possibility is to flip or invert the LIC flag to true and use the NLIC parameter set that is stored in the neighboring CU. In this way, two candidates can be generated, instead of one, when the neighboring block has an LIC flag equal to false. For example, video encoder 200 or video decoder 300 may generate two candidates when the neighboring block has an LIC flag equal to false. For example, video decoder 300 may generate the second merge list including changing a LIC flag value associated with the first merge list from false to true, and using an NLIC parameter set of a neighboring coding unit to generate two candidates.

Similarly, when the original merge candidate has an LIC flag equals to true, a total of three options may be available. The first option is to simply flip or invert the LIC flag to be false; the second option is to keep the LIC flag equal to true and inherit the LIC parameter set (derived between templates of the neighboring CU and the reference template of the neighboring CU) that is stored in the corresponding neighboring CU; the third option still keeps the LIC flag equal to true, but the NLIC parameter (derived between reconstruction and prediction samples) is inherited if the NLIC parameter is available from the neighboring CU. For example, video encoder 200 or video decoder 300 may employ any of these three options. For example, as part of generating the second merge list, video decoder 300 may determine that a value of local illumination compensation (LIC) flag associated with the first merge list is true. Video decoder 300 may, based on the determination that the value of the LIC flag associated with the first merge list is true, a) change the value of the LIC flag associated with the first merge list to false for the second merge list, b) keep the value of the LIC flag associated with the first merge list as true for the second merge list and inherit a LIC parameter set from a neighboring CU, or C) keep the value of the LIC flag associated with the first merge list as true for the second merge list and inherit an available non-local illumination compensation (NLIC) parameter set from the neighboring CU.

If the original merge candidate is coded with NLIC mode, a total of three options could be available. The first option is to set the LIC flag to false; the second option is to simply set the LIC flag to true and derive the LIC parameter using the template of current block and the reference template of the current block; a third option could be available if the neighboring CU has the LIC parameter set stored, if the parameter set is available, then the LIC parameter may be inherited and the LIC flag may be set to true for the new candidate. For example, video encoder 200 or video decoder 300 may employ any of these three options.

A LIC parameter set may contain two parameters with one representing a slope and the other representing an offset. Hence, instead of directly inheriting the LIC parameter set from a neighboring block, the LIC parameter set can be inherited from a neighboring block with an adjustment. In one example, the LIC parameter set is inherited and used with a slope adjustment. In a second example, the LIC parameter set is inherited and used with an offset adjustment. In a final example, the LIC parameter set is inherited and used with both a slope and an offset adjustment. For example, video encoder 200 or video decoder 300 may, for a current block, inherit a LIC parameter set from a neighboring block and employ at least a slope adjustment and/or an offset adjustment. For example, video decoder 300 may, as part of generating the second merge list, inherit a LIC parameter set from a neighboring CU and adjust at least one of a slope parameter of the LIC parameter set or an offset parameter of the LIC parameter set.

With the existence of the template matching cost-based LIC flag derivation technique as proposed in JVET-AF0128, different combinations of techniques can be designed. In one example, the LIC flag may be flipped or inverted, before the template matching-based technique is applied, to create the new merge list. In this way, the new list will have flipped or inverted LIC flags and the original list will have LIC flags decided by the template matching cost-based technique. For example, video encoder 200 or video decoder 300 may flip or invert the LIC flag prior to applying the template matching-based technique to generate a new candidate list. For example, as part of generating the second merge list, video decoder 300 may, prior to applying template matching to the candidates of the first merge list, change a plurality of LIC flag values associated with the first merge list to opposite values for the second merge list.

In a second example, the LIC flag may be flipped or inverted after the template matching cost-based LIC flag derivation technique, and the template matching cost-based technique may modify the LIC flag value in the original merge list. For example, as part of generating the second merge list, video decoder 300 may, after applying template matching to the candidates of the first merge list, change a plurality of LIC flag values associated with the first merge list to opposite values for the second merge list.

Regardless of the decision made by the template matching cost-based technique, the LIC flag value may be flipped or inverted in the new merge list. For example, video encoder 200 or video decoder 300 may generate such a new candidate list.

In a third example, because the template matching cost-based LIC flag derivation technique is currently only applied to uni-directional prediction merge candidates, the LIC flag flipping or inverting may only be applied to bi-directional prediction merge candidates such that the new merge candidate list only contains bi-directional prediction merge candidates from the original merge list having flipped LIC flag value(s). For example, video encoder 200 or video decoder 300 may only flip or invert LIC flags for bi-direction prediction merge candidates when generating the new merge candidate list. For example, video decoder 300 may determine that one or more candidates of the first merge list are bi-directional prediction merge candidates. Video decoder 300 may, for each of the bi-directional prediction merge candidates, change a respective LIC flag value associated with the first merge list to an opposite LIC flag value for the second merge list.

In a fourth example, a switching criterion is defined to switch between the template matching cost-based LIC flag derivation technique and the LIC flag flipping technique. For example, a block size threshold N may be defined where N represents the number of samples within the current block. If the number of samples is larger than N, the template matching cost-based LIC flag derivation technique will apply, otherwise, the flipping and flag signaling technique will be applied instead or vice versa. For example, video encoder 200 or video decoder 300 may apply the block size threshold N. For example, video decoder 300 may determine whether a block size of the current block is greater than a threshold. Video decoder 300 may, based on a determination that the block size of the current block is greater than the threshold, determine either a) one or more LIC flag values for the second merge list based on template matching cost, or b) the one or more LIC flag values for the second merge list by changing a respective value one or more LIC flags of the first merge list for the second merge list.

In another example, the template matching cost-based LIC flag derivation technique is simply disabled and only the flipping and flag signaling technique is used. For example, video encoder 200 or video decoder 300 may not apply the template matching cost-based LIC flag derivation technique and only apply the flipping and flag signaling techniques described herein.

Conditional signaling of LIC flag is now discussed. The signaling of the LIC flag for merge mode may not always be applied. In certain cases, the LIC flag may still be inherited from the neighboring blocks.

Block size can be used to decide whether the LIC flag will be signaled or inherited from the neighboring blocks. In one example, if a block has number of samples less than N, the LIC flag will be inherited and not signaled. In a second example, if a block has number of samples more than M, then the LIC flag is inherited and not signaled. In a third example, both thresholds from the first two examples are applied and LIC flag is only signaled if the block has number of samples larger than N and less than M. For example, video encoder 200 or video decoder 300 may employ such techniques.

Temporal ID may also be used as a criterion. In ECM in a random access configuration, a temporal ID is assigned to each picture and generally a higher temporal ID indicates that a picture's reference picture(s) are located closer in terms of temporal distance than if the temporal ID was lower. A closer temporal distance usually indicates a stronger similarity between the picture and reference picture(s) and hence a picture with higher temporal ID can usually be coded relatively inexpensively with a small number of bits. In this case, the overhead to signal the LIC flag may be relatively large for pictures with a higher temporal ID. Based on the above statement, in one example, the LIC flag for pictures with a temporal ID larger than K is inherited and, otherwise the LIC flag is signaled. For example, if a current picture has a temporal ID larger than K, video encoder 200 or video decoder 300 may inherit the LIC flag(s) for blocks of the current picture. If the current picture does not have a temporal ID larger than K, video encoder 200 may signal the LIC flag(s) for blocks of the current picture in a bitstream and video decoder 300 may parse the LIC flag(s) for such blocks.

Block location is other information that may be used to judge whether the LIC flag should be signaled. For example, when a block is located on the top-left corner of the picture, there may be no template available and hence the LIC model is not derived and the LIC flag is set to false. In this case, there is no need to signal the LIC flag. When the block is located on the top boundary or left boundary of the picture, only the left or above template is available, in this case video encoder 200 may also skip the signaling of the LIC flag. To summarize, in one example, when the top-left coordinates of a block has either horizontal coordinate x=0 or vertical coordinate y=0, the LIC flag may not be signaled. For example, if the top-left coordinates of a block have either horizontal coordinate x=0 or vertical coordinate y=0, video encoder 200 may refrain from signaling a LIC flag for that block.

Context separation is now discussed. CABAC context may be applied when coding the signaled LIC flag. In one example, two contexts are used, if one of a left or an above neighbor of the current block is coded by AMVP mode and the signaled LIC flag is true, the first context is used, otherwise the second context is used. In another example, three contexts are used, the index of the context is derived by leftIsLIC+aboveIsLIC, wherein leftIsLIC is one if a left neighboring block exists and is coded by AMVP mode and the LIC flag of the left neighboring block is on, aboveIsLIC is one if an above neighboring block exists and is coded by AMVP mode and the LIC flag of the above neighboring block is on. In yet another example, only one context is used. In still yet another example, the same context(s) for coding the LIC flag in AMVP mode is used. For example, video encoder 200 may employ any of such techniques.

Block size can also be used to separate context. In one example, different contexts are used to signal the LIC flag depending on the block size of the current block. For example, one context is used if the number of samples within the current block is smaller than N and a second context is used if the number of samples is larger than N. For example, video encoder 200 may determine whether the number of samples within the current block is smaller than N and based on the determination of whether the number of samples within the current block is smaller than N, use a particular context.

In some examples, video encoder 200 or video decoder 300 may reorder a candidate list. Candidate list may be reordered based on the cost, for example, based on the template matching cost. When LIC is enabled, then the cost may be derived considering the LIC model of every candidate. However, this may increase the complexity as different candidates may have different LIC models and those models need derivation. To avoid this complexity, the reordering of the candidates may be performed without applying LIC models, and a LIC model may be applied only at the prediction stage. In addition, the cost metrics should also be aligned (e.g., using only one of SAD, MRSAD, SATD, mean removed sum of absolute transformed difference (MR-SATD), SSE, mean removed sum of square error (MRSSE)) In this way, the reordering part of the LIC model with the signaled LIC flag and the regular merge mode may be shared.

In some examples, video encoder 200 or video decoder 300 may affect an interaction between LIC and DMVR. For regular merge mode, affine merge mode, and TM merge mode, DMVR can be applied if a candidate meets DMVR criteria. For example, video decoder 300 may determine to apply DMRV based on determining that one or more DMVR conditions are met. Currently in ECM, if the LIC flag for a merge candidate is true, only LIC may be applied and DMVR is bypassed even if other DMVR conditions are met. Thus, currently ECM does not permit the use of LIC together with DMVR. However, since both techniques refine the prediction signal, it may also be beneficial to enable both LIC and DMVR at the same time. In one example, if a merge candidate meets the other DMVR conditions except for current LIC flag condition (e.g., where LIC flag value is true), both DMVR and LIC process may be applied. For example, video decoder 300 may determine to decode a current block of the video data using a merge mode. Video decoder 300 may determine, for the current block, to apply LIC. Video decoder 300 may determine, for the current block, to apply DMVR. Video decoder 300 may decode the current block based on applying LIC and applying DMVR. For example, video decoder 300 may obtain a LIC flag in a bitstream. As part of determining to apply LIC, video decoder 300 may determine a value of the LIC flag, and the value of the LIC flag is indicative of applying LIC.

In a second example, opposite to the current ECM design, if a merge candidate meets the other DMVR conditions and LIC flag is also true, DMVR may be applied and LIC may be bypassed. In a third example, on top of the second example, the LIC flag may additionally be set to false for future inheritance. For example, video encoder 200 or video decoder 300 may utilize any of these techniques.

Currently, when DMVR is performed with an LIC flag equal to false, SAD is used as the distortion metric during the refinement process. As mentioned in the first example in the above paragraph, it is also possible to perform DMVR when LIC flag equals to true. However, due to illumination changes, it may be more accurate to use mean removed SAD (MRSAD) as the distorting metric instead of SAD. In one example, when performing DMVR with LIC flag equals to true for affine merge mode, MRSAD is used instead of SAD. For example, video encoder 200 or video decoder 300 may use MRSAD as the distortion metric during the DMVR refinement process. For example, as part of applying DMVR, video decoder 300 may use MRSAD. For example, as part of using MRSAD, video decoder 300 may use MRSAD in lieu of SAD.

For affine DMVR, a series of sequential processing steps (as described above) may be applied which bring complexity, especially in the decoder side since DMVR is a decoder side refinement technique. When allowing affine DMVR to be performed with a LIC flag equal to true, both the complexity of LIC and affine DMVR may be increased in a video decoder. To reduce the complexity of LIC and affine DMVR combinations, an affine DMVR process may be performed as a simplified version. For example, video decoder 300 may perform LIC and a simplified version of DMVR. In one example, when the LIC flag is true, affine DMVR is only applied with the subblock offset-based affine DMVR refinement technique. For example, video decoder 300 may only apply subblock offset-based affine DMVR refinement. In a second example, affine DMVR is applied for both the subblock offset-based affine DMVR refinement technique and a regression-based affine DMVR refinement technique. For example, video decoder 300 may apply subblock offset-based affine DMVR refinement and regression-based affine DMVR refinement In a third example, affine DMVR is performed with all DMVR steps except an affine model parameter refinement technique. For example, video decoder 300 may apply affine DMVR and bypassing affine model parameter refinement.

In some examples, video encoder 200 or video decoder 300 may utilize LIC on/off (e.g., true/false) switching without signaling. As described above, to switch the on/off of a LIC flag for merge mode, a second merge list may be created from the original list and a flag may be signaled to indicate whether the original or the new merge list should be used. However, it is possible to save the signaling overhead. In one example, the original and the new list are merged into one list by concatenation, and the merged list is used as the input for SATD stage. In a second example, compared to the first example, the two merge lists are merged in interleaved order instead of concatenation.

In some examples, video encoder 200 or video decoder 300 may select a BCW weight. When creating the new merge list for merge mode LIC flag signaling, the BCW weight may also be handled differently compared to directly copying the BCW weight from the original merge list. In one example, the BCW weight in the new merge list is set to a default value. In ECM, a template matching-based BCW weight derivation technique is introduced. Basically, the different BCW weight is used to combine the two reference templates into one reference template in a case of bi-predicted merge candidates and compared against the template of the current block by computing the SAD cost to decide a best BCW weight. When LIC flag is true, the LIC model is additionally derived and applied to the current template before SAD computation, which will lead to a different result compared to when the LIC flag is false. Hence, in a second example, the BCW weight for the new merge list is derived independently from the original merge list.

In some examples, video encoder 200 or video decoder 300 may use a LIC model to derive parameters for weighted prediction. This disclosure describes the use of LIC model(s) to derive parameters for weighted prediction when LIC is enabled.

As an example, in ECM-10.0, LIC can be applied to bi-directional prediction. In this case, LIC can be applied to each predictor before the weighted average of the two predictors is calculated as the final bi-predictor. In this example, the weights that are used in the weighted average process can be derived using the LIC model parameters and reconstructed samples that are available when the current block is being reconstructed. For example, video encoder 200 or video decoder 300 may use such techniques.

As an example, the same lines of samples that used to derive the LIC parameters (referred to as "template samples", the template of the current block is referred to as "current template ($T_c$)" and the template of reference block is referred to as "reference template ($T_r$)") are used to derive the weights. For examples, a template in LIC model derivation may be subsampled, e.g., not all samples in the template may be used, so deriving the cost of the model using the entire template may be more accurate with the mentioned subsampling since the model may be verified on the samples which might not be used in the model derivation. In one example, whether subsampling is used may be used as a condition to verify the model, e.g., to derive the cost, on the template. If subsampling is not used, then other samples, not included in the model derivation, may be used for the cost derivation. For example, video encoder 200 or video decoder 300 may use such techniques.

For example, for each predictor, the LIC parameters are applied to the $T_r$ and the SAD between the resulting samples and the current template (Cost=SAD ($T'_r$, $T_c$)). When performing a weighted average, weights of the 2 predictors are calculated as $$\text{Weight}_i = \frac{\text{Cost}_i}{\text{Cost}_0 + \text{Cost}_1},$$

where $\text{Cost}_0$, $\text{Cost}_1$ correspond to the cost calculated as applying the corresponding LIC parameters to $\text{predoctor}_0$ and $\text{predictor}_1$. The $\text{Weight}_i$ is the weight used for $\text{predictor}_i$. For example, video encoder 200 or video decoder 300 may use such techniques.

Specific condition(s) can be designed to switch the proposed technique on/off.

As an example, when $\text{Cost}_0 == 0$ and $\text{Cost}_1 == 0$, the proposed technique is turned off. As another example, when $\text{Cost}_0 < \text{threshold}_0$ and/or $\text{Cost}_1 < \text{threshold}_1$, the proposed technique is turned off. As yet another example, one or more syntax elements are signaled to indicated whether the proposed is used, and the signaling can be at different levels in a bit-stream (SPS, PPS, Slice, CTU, CU, etc.). For example, video encoder 200 or video decoder 300 may use such techniques.

The disclosed technique may be signaled as part of BCW. As an example, the disclosed technique may be signaled as part of BCW in a design that BCW is signaled after LIC. Depending on the value of LIC syntax, the BCW may be signaled as follows: If LIC==0, BCW signaling is unchanged; If LIC!=0, BCW signals 2 choices: a) default BCW is used (usually 1:1 weighted average), or b) the disclosed LIC cost-based weighted average is used. As another example, the disclosed technique may be signaled as part of BCW in a design that LIC is signaled after BCW. Depending on the value of BCW syntax, the LIC may be signaled as follows: If BCW syntax element has a value of 0: LIC is signaled and default BCW is used for both LIC==0 and LIC!=0 cases; If BCW syntax element is another specified value (e.g., 1), LIC is signaled. If LIC is 0. The BCW weights corresponding to the BCW syntax element value are used, and if LIC is non-zero, then instead of using the BCW weights, the technique disclosed in this disclosure is used; If BCW syntax element is any other value, then LIC flag is not signaled, and the value of the LIC flag is set to 0. For example, video encoder 200 or video decoder 300 may use such techniques.

In one example, video encoder 200 or video decoder 300 may apply BDOF and/or bilateral DMVR (BDMVR) to a LIC coded block. In current ECM, a coding block may apply PROF to refine a luma prediction block and the PROF refined luma prediction block is further refined by applying LIC. However, when a block meets a BDOF condition and the block is determined to be refined by applying LIC, the BDOF refinement is not applied to the block.

This disclosure describes applying LIC refinement and BDOF refinement to a coding block when the coding block is determined to apply LIC, e.g., signal a LIC flag or derive a LIC flag from a merge candidate, and the coding block meets a BDOF condition. The BDOF conditions are one or more of the following: 1) the current block is a bi-prediction coding block; 2) the current block has two reference blocks, wherein, one reference block is located in a reference picture in the past relative to the current picture, and one reference bock is located in a reference picture in the future relative to the current picture; 3) the current block has an equal POC distance to the two reference pictures relative to the current picture; 4) the current block has an equal weight of each reference block. For example, video encoder 200 or video decoder 300 may use such techniques.

This disclosure describes applying LIC refinement and bilateral DMVR (BDMVR) refinement to a coding block when the coding block is determined to apply LIC, e.g., signal a LIC flag or derive a LIC flag from a merge candidate, and the coding block meets a BDMVR condition. The BDMVR conditions are one or more of the following: a) the current block is a bi-prediction coding block; b) the current block has two reference blocks, wherein, one reference block is located in a reference picture in the past relative to the current picture, and one reference block is located on a reference picture in the future relative to the current picture; c) the current block has an equal POC distance to the two reference pictures relative to the current picture. For example, video encoder 200 or video decoder 300 may use such techniques.

In one example, when LIC and BDOF are both applied to a coding block, the BDOF subblock MV refinement is bypassed. The BDOF is applied to adjust luma samples. In one example, for each luma sample video encoder 200 or video decoder 300 derives a Vx and Vy, which is applied to the gradient of the sample to derive the luma sample adjustment value. In one example, a subset of luma samples, e.g., a subblock MxN of the coding block, share same Vx and Vy, which is applied to the gradient of each luma sample with in the M×N subblock to derive the luma sample adjustment value.

In one example, when LIC and BDMVR are both applied to a coding block, the BDMVR subblock MV refinement is bypassed. The BDMVR is only applied to refine the MV0 and MV1 on coding block level. LIC is applied using the PU level refined MVs. In case of affine coded block, the BDMVR is only applied to the coding block level CPMV refinement. The updated CPMV is used to derive the updated sub-block motion vector field and the updated sub-block motion vector field is used for LIC process. For example, video encoder 200 or video decoder 300 may use such techniques.

In one example, when LIC and BDMVR are both applied to a coding block, BDMVR is still applied on coding block level, however, LIC uses the unrefined coding block level MV instead of the refined MV for model derivation. Similarly, in case of affine coded block, the unrefined CPMV will be used for LIC. For example, video encoder 200 or video decoder 300 may use such techniques.

In one example, when LIC and BDMVR are both applied to a coding block, not only the coding block level BDMVR, but also the sub-block level BDMVR refinement are applied. However, the PU-level refined MV is used for the LIC process. For example, video encoder 200 or video decoder 300 may use such techniques.

In yet another example, based on the above example, instead of the PU level refined MV, the original unrefined MV is used for the LIC process.

In one example, when LIC and BDOF are both applied to a coding block, not only the BDOF luma sample adjustment, but also the BDOF sub-block MV refinement are both applied. The LIC process is applied after BDOF and with the BDOF refine sub-block MV. For example, video encoder 200 or video decoder 300 may use such techniques.

In yet another example, based on the above example, the LIC process is applied before BDOF and the sub-block MV used in LIC is the input to the BDOF process.

In one example, when LIC is determined to be applied to the coding block, and the coding block meets the BDOF and/or BDMVR condition(s), the entire coding block has a MV0 on L0 reference picture and MV1 on L1 reference picture. Wherein, the MV0 and MV1 has a minimum bilateral matching cost of the local surrounding area, wherein the local surrounding area is defined as using a center MV on each L0 and L1 reference picture, and the center MV is derived from merge candidate or signaled in bitstream. For example, video encoder 200 or video decoder 300 may use such techniques.

In one example, the LIC reconstruct template is the adjacent top line/left column of the coding block, and the LIC reference templates are derived from the MV0 and MV1 with an offset (−1, −1) on reference picture L0 and L1 respectively. Wherein, MV0 and MV1 can be the MV after BDMVR refinement. For example, video encoder 200 or video decoder 300 may use such techniques.

In one example, the LIC reconstruct template is the top line/left column with an offset K to the coding block top/left boundary, and the LIC reference templates are derived from the MV0 and MV1 with an offset (−K−1, −K−1) on reference picture L0 and L1 respectively. Wherein, K is BDOF extend reference block size, K<=3. Wherein, MV0 and MV1 can be the MV after BDMVR refinement. For example, video encoder 200 or video decoder 300 may use such techniques.

In one example, the LIC reference templates of L0 and L1 are used separately with the LIC reconstruct template to derive LIC parameters of L0 and L1. The derived LIC parameters of L0 and L1 are applied to the BDOF extended reference block of L0 and L1 respectively, and the LIC refined extended reference block is used as input to BDOF process to derive gradient and Vx, Vy which are used to derive Luma sample adjustments. The luma sample adjustment is applied to weighted bi-prediction to derive the final prediction block. For example, video encoder 200 or video decoder 300 may use such techniques.

In one example, the LIC reference templates of L0 and L1 are jointly used to derive LIC parameters for the coding block. The derived LIC parameters are applied to BDOF and/or BMDVR refined prediction block to derive the final prediction block. For example, video encoder 200 or video decoder 300 may use such techniques.

In one example, a subset of proposed techniques is applied to AMVP mode. In one example, a subset of proposed techniques is applied to regular merge mode. In one example, a subset of proposed techniques is applied to bilateral matching merge mode. In one example, a subset of proposed techniques is applied to TM merge mode. In one example, a subset of proposed techniques is applied to AMVP-merge mode. In one example, a subset of proposed techniques is applied to an affine coded block.

In one example, video encoder 200 may signal a LIC index to indicate higher-order LIC model selection. The LIC flag may be extended to accommodate more LIC models. LIC equal to 0 and 1 map respectively to false and true, as described above, and LIC equal to 2 or large integer values may correspond to higher-order LIC models, as follows:

$$p'_0[x, y] = \sum_{m,n} \alpha_{0,m,n} \cdot P_0[x+m, y+n] + \beta_0 \text{ for reference picture list 0}$$

$$p'_1[x, y] = \sum_{m,n} a_{1,m,n} \cdot P_1[x+m, y+n] + \beta_1 \text{ for reference picture list 1},$$

where (m, n)∈{(0, 0)∪S}. The S is a coordination set, and when S is empty, the equations are degenerated to be identical to those of described above. For example, the S could be, but not limited to, {(±1,0)}, {(0, ±1)}, {(±1,0), (0, ±1)} or {(±1,0), (0, ±1), (±1, ±1)}. When the LIC flag >1, it may be guaranteed that the LIC model selection of each merge candidate in candidate list is the same. Given the motion information of a merge candidate, the model parameters (e.g., $\alpha_{0,m,n}$, $\alpha_{1,m,n}$, $\beta_0$, $\beta_1$ when needed) are derived accordingly to minimize the MSE between current block templates and reference templates. For example, video encoder 200 or video decoder 300 may use such techniques.

In another example, this LIC index can also to signaled in AMVP mode, where a 0 indicates LIC is off, a 1 indicates traditional LIC is used, and a larger integer indicates one of higher-order LIC models is used.

Simplified decoder-side techniques for merge candidates with a flipped LIC flag are now discussed. Decoder-side techniques for motion and prediction refinement (such as DMVR, multi-pass DMVR, BDOF, etc.) can be simplified or bypassed to reduce decoding complexity in an average case. Video decoder 300 may utilize such simplified decoder-side techniques. The following examples can be applied when the LIC flag is flipped (either from true to false or from false to true) for merge modes, including but not limited to regular merge modes, template matching merge modes, affine merge modes, or subblock TMVP merge modes.

In an example, when the LIC flag is flipped, decoder-side motion refinement (DMVR) can be bypassed.

In an example, when the LIC flag is flipped, multi-pass DMVR (described above) can be bypassed completely or partially, e.g., all passes being bypassed, only first pass being bypassed, only second pass being bypassed, only third pass being bypassed, or two of three passes being bypassed.

In an example, when the LIC flag is flipped, BDOF for prediction refinement can be bypassed completely. In an example, when the LIC flag is flipped, multi-iteration MV refinement of BDOF can be bypassed completely.

In an example, multi-iteration MV refinement of BDOF may be extended to accommodate more iterations beyond the $4^{th}$ BDOF MV refinement pass mentioned above. BDOF MV refinement can go to at most N-th iteration (where N>4) and could be early-terminated before reaching the N-th iteration when zero Vx and Vy are derived in an iteration. When the LIC flag is flipped and n-th (where n<N) BDOF MV refinement derives a non-zero Vx or Vy, video encoder 200 or video decoder 300 may bypass all remaining iterations of BDOF MV refinement.

Figure 16:
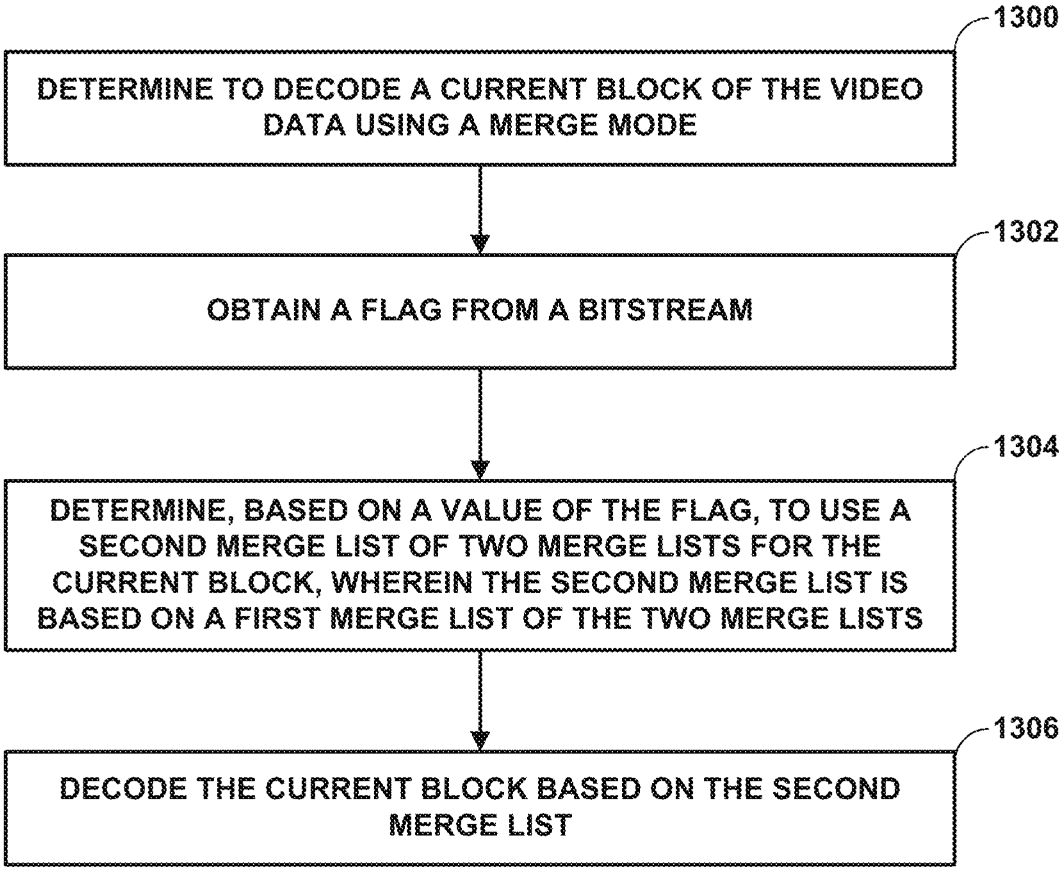
FIG. 16 is a flowchart illustrating example signaling techniques for whether to use a first merge list or a second merge list according to one or more aspects of this disclosure.

FIG. 16 is a flowchart illustrating example signaling techniques for whether to use a first merge list or a second merge list according to one or more aspects of this disclosure. Video decoder 300 may determine to decode a current block of the video data using a merge mode (1300). For example, video encoder 200 may signal a merge mode flag in a bitstream whose value is indicative of using a merge mode for the current block. Video decoder 300 may obtain the merge mode flag from the bitstream and parse the merge mode flag to determine that video decoder 300 should decode the current block using a merge mode as indicated by the merge mode flag.

Video decoder 300 may obtain a flag from a bitstream (1302). For example, video decoder 300 may obtain a flag in the bitstream, signaled by video encoder 200. This flag may have a value indicative of whether to use a first merge list or a second merge list.

Video decoder 300 may determine, based on a value of the flag, to use a second merge list of two merge lists for the current block, wherein the second merge list is based on a first merge list of the two merge lists (1304). For example, video decoder 300 may parse the flag to determine the value of the flag, and the value of the flag may indicate that video decoder 300 use the second merge list.

Video decoder 300 may decode the current block based on the second merge list (1306). For example, video decoder 300 may decode the current block using a candidate from the second merge list.

In some examples, video decoder 300 may generate a first merge list of the two merge lists and generate the second merge list based on the first merge list. In some examples, as part of generating the first merge list, video decoder 300 may determine a plurality of merge candidates, each of the plurality of merge candidates in the first merge list having a respective LIC flag value inherited from a respective neighboring block. In some examples, as part of generating the second merge list, video decoder 300 may copy the plurality of merge candidates from the first merge list to the second merge list and changing a respective LIC flag value for each of the plurality of merge candidates to an opposite value. In some examples, video decoder 300 may trim the plurality of merge candidates in the second merge list. In some examples, video decoder 300 may perform template matching cost-based reordering on the second merge list.

In some examples, as part of generating the second merge list, video decoder 300 may change a LIC flag value associated with the first merge list from false to true, and use a NLIC parameter set of a neighboring coding unit to generate two candidates.

In some examples, as part of generating the second merge list, video decoder 300 may determine that a value of a LIC flag associated with the first merge list is true. Based on the determination that value of the LIC flag associated with the first merge list is true, video decoder 300 may a) change the value of the LIC flag associated with the first merge list to false for the second merge list, b) keep the value of the LIC flag associated with the first merge list as true for the second merge list and inherit a LIC parameter set from a neighboring CU, or C) keep the value of the LIC flag associated with the first merge list as true for the second merge list and inherit an available NLIC parameter set from the neighboring CU.

In some examples, as part of generating the second merge list, video decoder 300 may inherit a LIC parameter set from a neighboring CU and adjust at least one of a slope parameter of the LIC parameter set or an offset parameter of the LIC parameter set.

In some examples, the merge mode includes a regular merge mode, a bilateral matching merge mode, a template matching merge mode, an advanced motion vector predictor merge mode, or an affine merge mode. In some examples, the merge mode includes the affine merge mode. In some examples, the first merge list includes a plurality of candidates. In some examples, the plurality of candidates includes at least one affine merge candidate. In some examples, the plurality of candidates further includes at least one subblock temporal motion vector predictor merge candidate.

In some examples, as part of generating the second merge list, video decoder 300 may copy the plurality of candidates from the first merge list to the second merge list and invert a respective LIC flag for each respective of the plurality of candidates in the second merge list. In some examples, the second merge list does not include the at least one subblock temporal motion vector predictor merge candidate. In some examples, as part of generating the second merge list, video decoder 300 may replace at least one subblock temporal motion vector predictor merge candidate with at least one other affine merge candidate.

Figure 17:
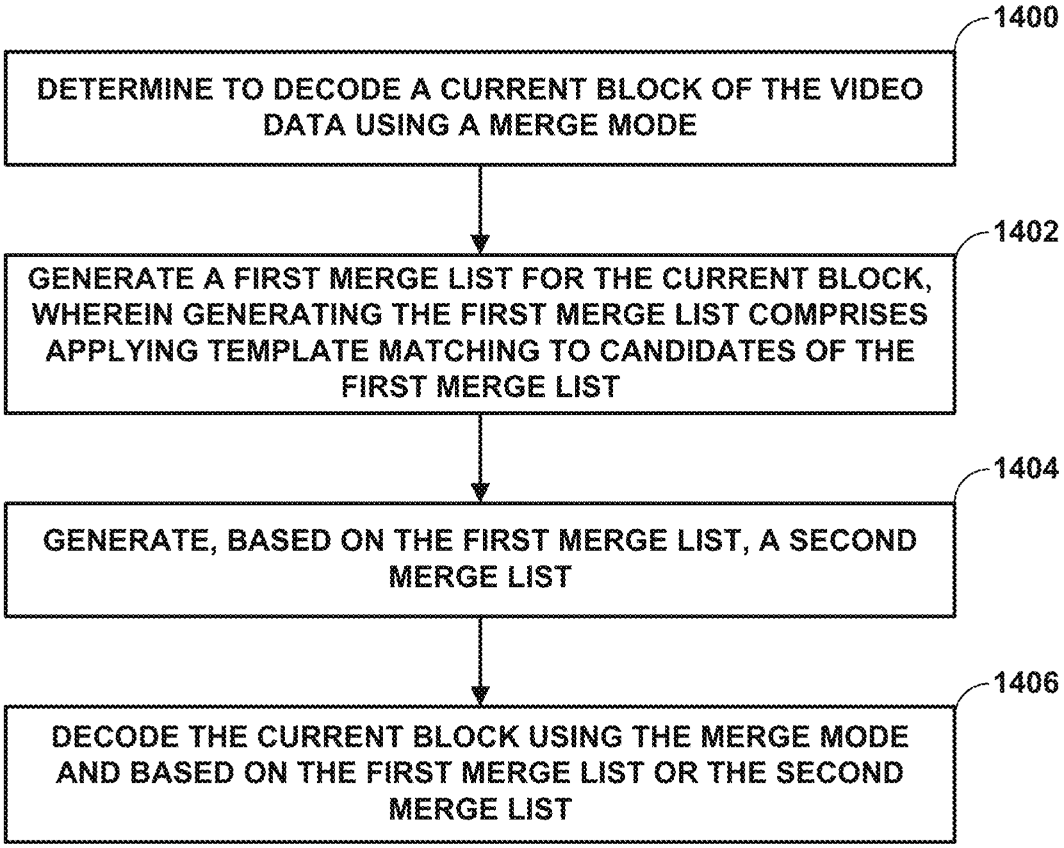
FIG. 17 is a flowchart illustrating example techniques for template matching-based local illumination compensation and a second merge list according to one or more aspects of this disclosure.

FIG. 17 is a flowchart illustrating example techniques for template matching-based local illumination compensation and a second merge list according to one or more aspects of this disclosure. Video decoder 300 may determine to decode a current block of the video data using a merge mode (1400). For example, video encoder 200 may signal a merge mode flag in a bitstream whose value is indicative of using a merge mode for the current block. Video decoder 300 may obtain the merge mode flag from the bitstream and parse the merge mode flag to determine that video decoder 300 should decode the current block using a merge mode as indicated by the merge mode flag.

Video decoder 300 may generate a first merge list for the current block, wherein generating the first merge list comprises applying template matching to candidates of the first merge list (1402). For example, video decoder 300 may use template matching when generating the first merge list.

Video decoder 300 may generate, based on the first merge list, a second merge list (1404). For example, video decoder may generate the second merge list using one or more candidates from the first merge list.

Video decoder 300 may decode the current block using the merge mode and based on the first merge list or the second merge list (1406). For example, video decoder 300 may select either the first merge list or the second merge list to select one or more prediction candidates and may use the selected prediction candidate(s) to decode the current block using the merge mode.

In some examples, as part of generating the second merge list, video decoder 300 may, prior to applying template matching to the candidates of the first merge list, change a plurality of local illumination compensation (LIC) flag values associated with the first merge list to opposite values for the second merge list. In some examples, as part of generating the second merge list, video decoder 300 may, after applying template matching to the candidates of the first merge list, change a plurality of local illumination compensation (LIC) flag values associated with the first merge list to opposite values for the second merge list.

In some examples, as part of generating the second merge list, video decoder 300 may, prior to applying template matching to the candidates of the first merge list, trimming candidates of the first merge list for the second merge list. In some examples, as part of generating the second merge list, video decoder 300 may, after applying template matching to the candidates of the first merge list, trim candidates of the first merge list for the second merge list.

In some examples, as part of generating the second merge list, video decoder 300 may determine that one or more candidates of the first merge list are bi-directional prediction merge candidates, and, for each of the bi-directional prediction merge candidates, changing a respective LIC flag value associated with the first merge list to an opposite LIC flag value for the second merge list. In some examples, as part of generating the second merge list, video decoder 300 may determine whether a block size of the current block is greater than a threshold, and, based on a determination that the block size of the current block is greater than the threshold, determining either a) one or more local illumination compensation (LIC) flag values for the second merge list based on template matching cost, or b) the one or more LIC flag values for the second merge list by changing a respective value one or more LIC flags of the first merge list for the second merge list.

In some examples, video decoder 300 may obtain a flag from a bitstream. In some examples, video decoder 300 may determine, based on a value of the flag, to use the second merge list to decode the current block, and decode the current block using the second merge list.

Figure 18:
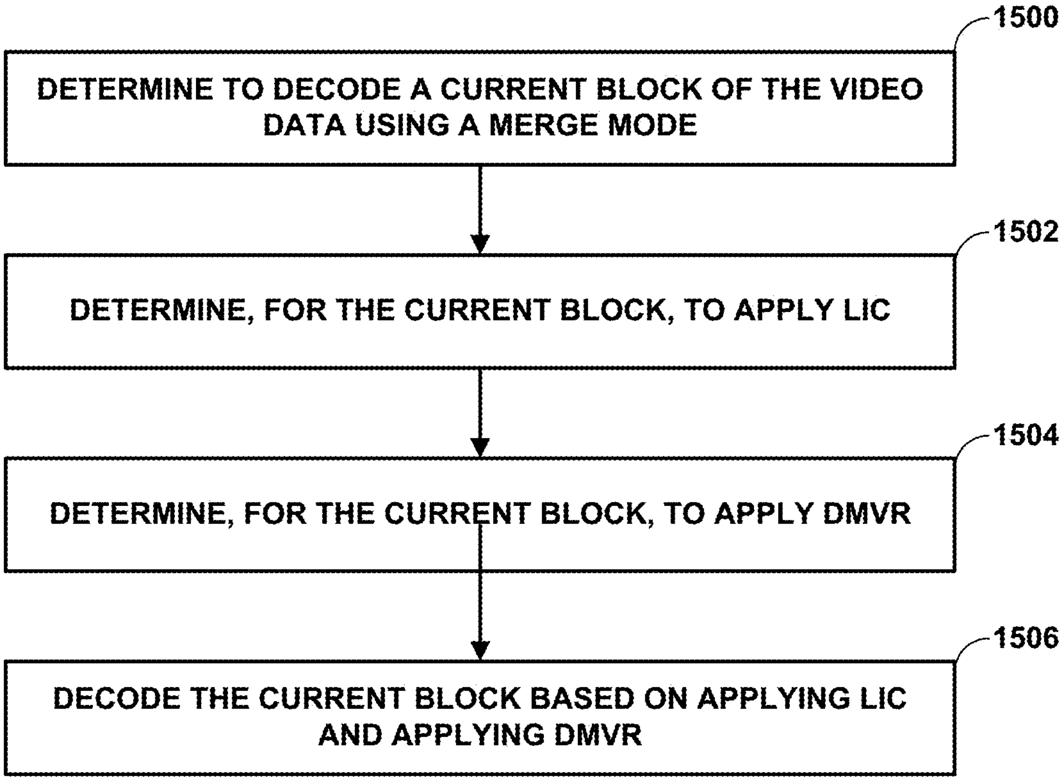
FIG. 18 is a flowchart illustrating techniques for using local illumination compensation together with delta motion vector refinement according to one or more aspects of this disclosure.

FIG. 18 is a flowchart illustrating techniques for using local illumination compensation together with delta motion vector refinement according to one or more aspects of this disclosure. Video decoder 300 may determine to decode a current block of the video data using a merge mode (1500). For example, video encoder 200 may signal a merge mode flag in a bitstream whose value is indicative of using a merge mode for the current block. Video decoder 300 may obtain the merge mode flag from the bitstream and parse the merge mode flag to determine that video decoder 300 should decode the current block using a merge mode as indicated by the merge mode flag.

Video decoder 300 may determine, for the current block of the video data, to apply LIC (1502). For example, video decoder 300 may determine to apply LIC based on either a signaled LIC flag from video encoder 200 or by inheriting LIC parameters from a neighboring block.

Video decoder 300 may determine, for the current block, to apply DMVR (1504). For example, video decoder 300 may obtain a flag in a bitstream from video encoder 200 whose value indicates that video decoder 300 apply DMVR for the current block and/or determine that DMVR condition(s) are met for the current block.

Video decoder 300 may decode the current block based on applying LIC and applying DMVR (1506). For example, video decoder 300 may apply both LIC and DMVR when decoding the current block.

In some examples, video decoder 300 may obtain a LIC flag in a bitstream. In some examples, as part of determining to apply LIC, video decoder 300 may determine a value of the LIC flag, wherein the value of the LIC flag is indicative of applying LIC.

In some examples, as part of applying DMVR, video decoder 300 may use MRSAD. In some examples, as part of using MRSAD, video decoder 300 may use MRSAD in lieu of a SAD.

In some examples, video decoder 300 may apply BDOF for the current block. In some examples, the merge mode includes a regular merge mode, a bilateral matching merge mode, a template matching merge mode, an advanced motion vector predictor merge mode, or an affine merge mode. In some examples, the merge mode includes the affine merge mode, and as part of applying DMVR, video decoder 300 may only applying subblock offset-based affine DMVR refinement. In some examples, as part of applying DMVR, video decoder 300 may apply subblock offset-based affine DMVR refinement and regression-based affine DMVR refinement. In some examples, as part of applying DMVR, video decoder 300 may apply affine DMVR and bypass affine model parameter refinement.

Figure 19:
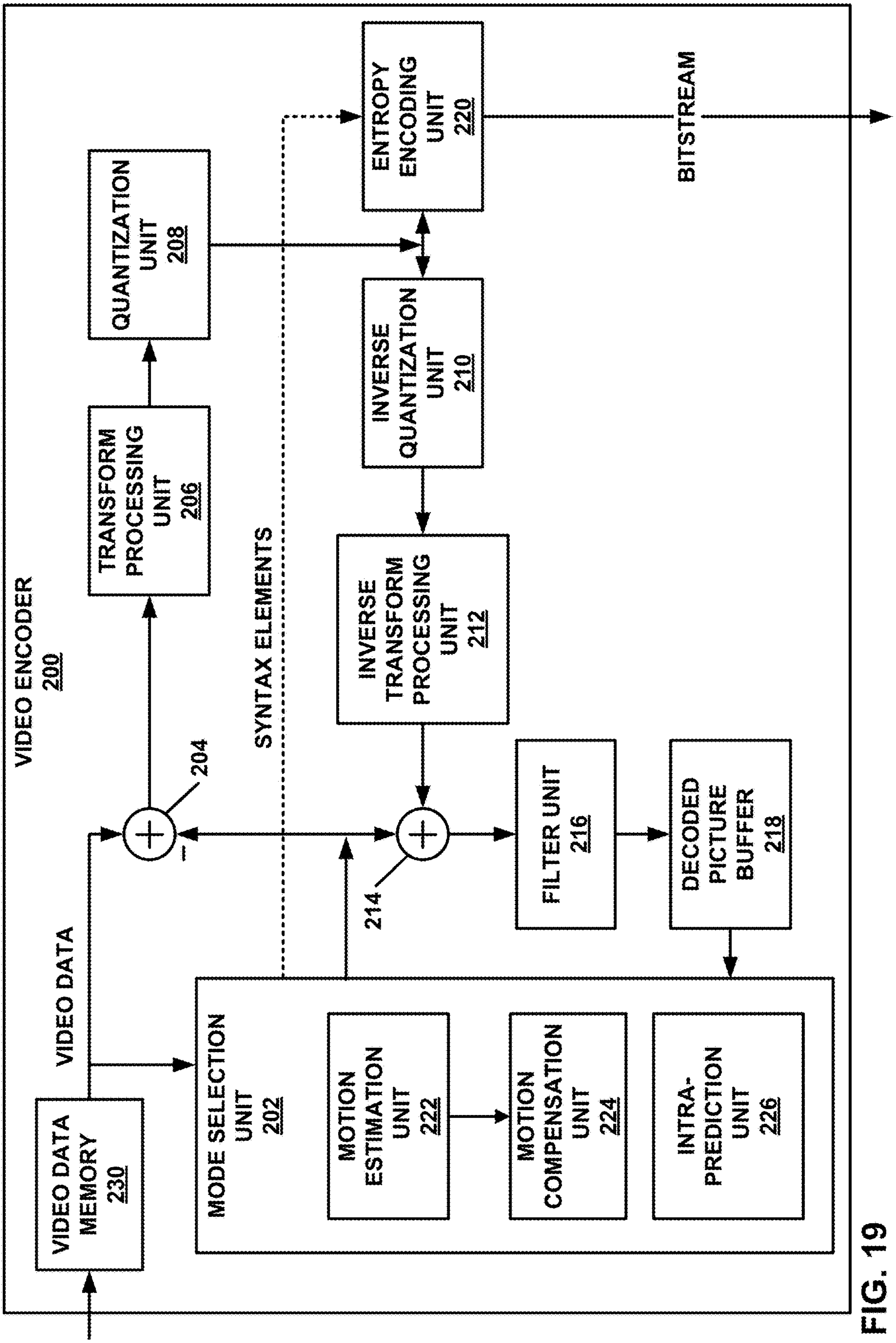
FIG. 19 is a block diagram illustrating an example video encoder that may perform the techniques of this disclosure.

FIG. 19 is a block diagram illustrating an example video encoder 200 that may perform the techniques of this disclosure. FIG. 19 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 19, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 19 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine to apply merge mode to a current block of the video data; determine whether to apply local illumination compensation (LIC) independently of whether LIC is applied to a neighboring block; and encode the current block based on merge mode and the determination of whether to apply LIC.

Figure 20:
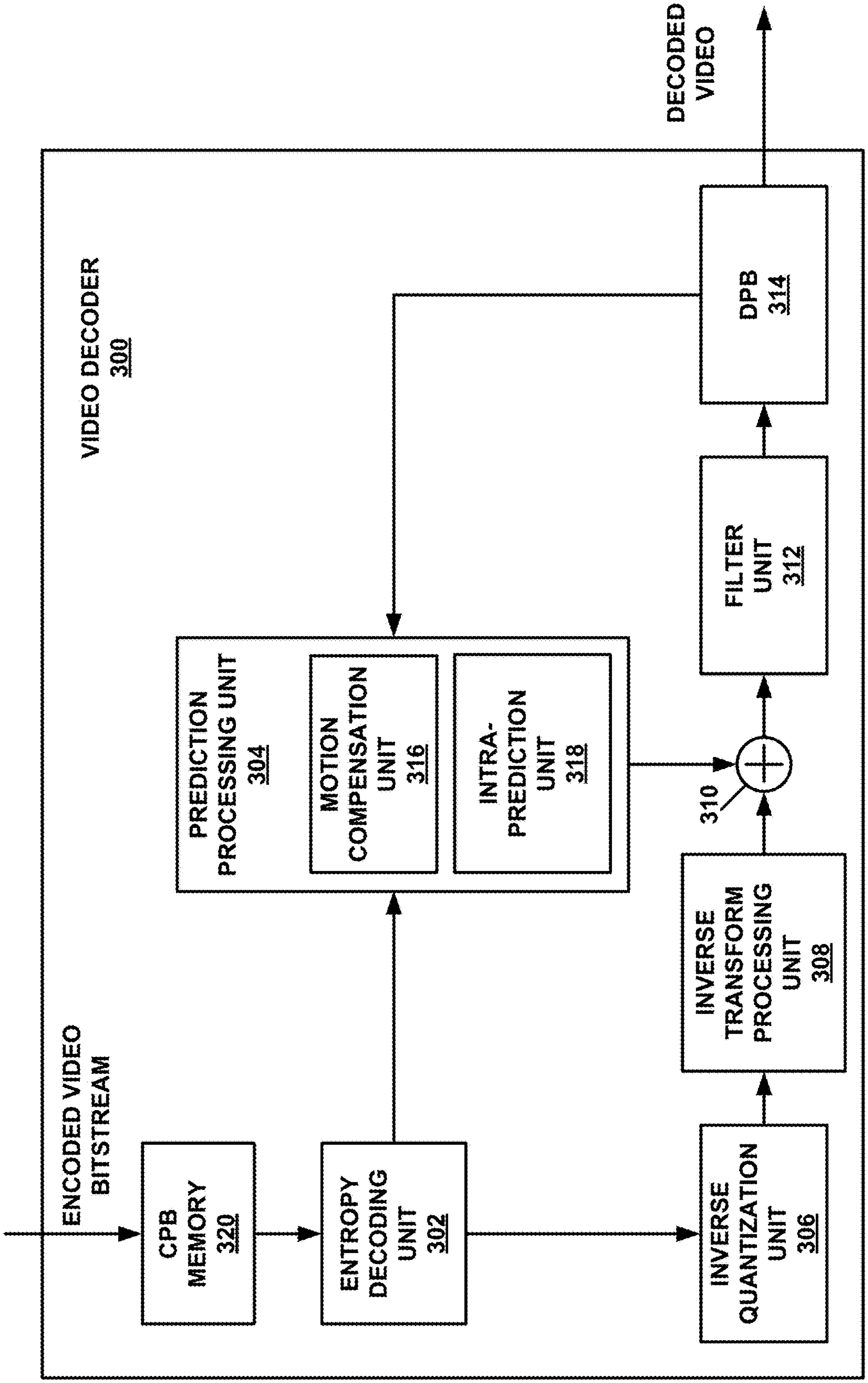
FIG. 20 is a block diagram illustrating an example video decoder that may perform the techniques of this disclosure.

FIG. 20 is a block diagram illustrating an example video decoder 300 that may perform the techniques of this disclosure. FIG. 20 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 20, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally, or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 20 are illustrated to assist with understanding the operations performed by video decoder 300. The units may be implemented as fixed-function circuits, programmable circuits, or a combination thereof. Similar to FIG. 19, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, e.g., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 19).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 19). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine to apply merge mode to a current block of the video data; determine whether to apply local illumination compensation (LIC) independently of whether LIC is applied to a neighboring block; and decode the current block based on merge mode and the determination of whether to apply LIC.

Figure 21:
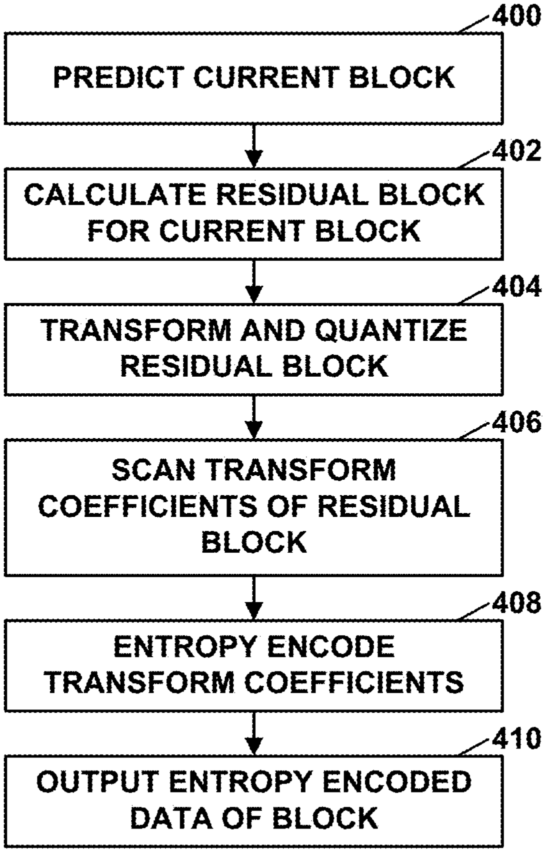
FIG. 21 is a flowchart illustrating an example method for encoding a current block in accordance with the techniques of this disclosure.

FIG. 21 is a flowchart illustrating an example technique for encoding a current block in accordance with the techniques of this disclosure. The current block may be or include a current CU. Although described with respect to video encoder 200 (FIGS. 1 and 16), it should be understood that other devices may be configured to perform a technique similar to that of FIG. 21.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 22:
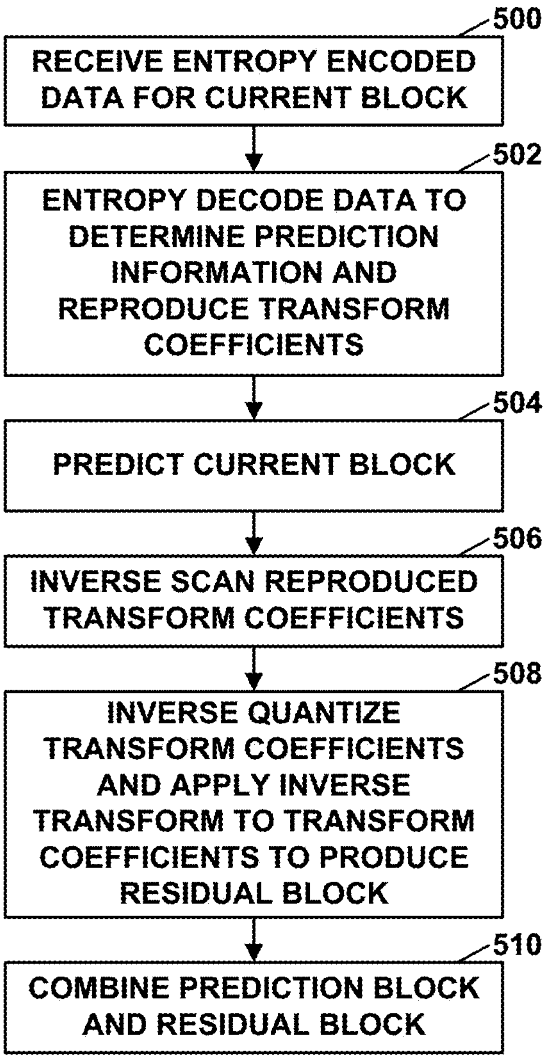
FIG. 22 is a flowchart illustrating an example method for decoding a current block in accordance with the techniques of this disclosure.

FIG. 22 is a flowchart illustrating an example technique for decoding a current block of video data in accordance with the techniques of this disclosure. The current block may be or include a current CU. Although described with respect to video decoder 300 (FIGS. 1 and 20), it should be understood that other devices may be configured to perform a technique similar to that of FIG. 22.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508).

Video decoder 300 may ultimately decode the current block by combining the prediction block and the residual block (510).

The following numbered clauses illustrate one or more aspects of the devices and techniques described in this disclosure.

Clause 1A. A method of coding video data, the method comprising: determining to apply merge mode to a current block of the video data; determining whether to apply local illumination compensation (LIC) independently of whether LIC is applied to a neighboring block; and coding the current block based on merge mode and the determination of whether to apply LIC.

Clause 2A. The method of clause 1A, wherein determining whether to apply LIC comprises disabling LIC for the current block based on the determination to apply merge mode to the current block.

Clause 3A. The method of clause 1A, wherein determining whether to apply LIC comprises enabling LIC for the current block based on the determination to apply merge mode to the current block.

Clause 4A. The method of clause 1A, further comprising signaling or parsing a LIC flag indicative of whether LIC is applied to the current block.

Clause 5A. The method of any of clauses 1A-4A, further comprising reordering a candidate list prior to applying a LIC model.

Clause 6A. The method of any of clauses 1A-5A, further comprising: determine whether one or more decoder-side motion vector refinement (DMVR) conditions are met; and based on whether one or more DMVR conditions are met, take an action.

Clause 7A. The method of clause 6A, wherein the action comprises one of: applying DMVR and LIC; applying DMVR without applying LIC; or applying DMVR without applying LIC and setting a LIC flag to false.

Clause 8A. The method of any of clauses 1A-7A, further comprising: generating a first merge list; and generating a second merge list, wherein at least one of the first merge list or the second merge list is used to determine whether to apply LIC.

Clause 9A. The method of clause 8A, further comprising combining the first merge list and second merge list.

Clause 10A. The method of clause 9A, wherein combining comprises concatenating or interleaving.

Clause 11A. The method of any of clauses 1A-10A, further comprising: generating a new merge list for merge mode LIC flag signaling; and determining a bi-prediction with CU-level weight (BCW) value for the new merge list.

Clause 12A. The method of clause 11A, wherein determining the BCW value comprises setting the BCW value to a default value or deriving the BCW value independently from an original merge list.

Clause 13A. The method of any of clauses 1A, or 3A-10A, further comprising: determining that LIC is enabled for the current block; and using LIC to derive parameters for weighted prediction of the current block.

Clause 14A. The method of any of clauses 1A, or 3A-11A, further comprising: determining to apply LIC to the current block; determining whether to subsample a template to derive a LIC model for the current block; and based on a determination not to subsample the template, including additional samples to derive the LIC model.

Clause 15A. The method of any of clauses 1A, or 3A-14A, further comprising: determine to apply LIC to the current block; determine whether one or more bi-directional optical flow (BDOF) conditions are met; and based on the determination to apply LIC and the determination that one or more BDOF conditions are met, apply BDOF to the current block.

Clause 16A. The method of clause 15A, wherein the one or more BDOF conditions comprise: a) the current block is a bi-prediction coding block; b) the current block has a first reference block in a first reference picture, the first reference picture being in the past compared to a current picture, and a second reference block in a second reference picture, the second reference picture being in the future compared to the current picture; c) a picture order count (POC) distance between the current picture and the first reference picture is equal to the POC distance between the current picture and the second reference picture; or d) the current block has an equal weight of each reference block.

Clause 17A. The method of any of clauses 1A, or 3A-16A, further comprising: determine to apply LIC to the current block; determine whether one or more bilateral decoder-side motion vector refinement (BDMVR) conditions are met; and based on the determination to apply LIC and the determination that one or more BDMVR conditions are met, apply BDMVR to the current block.

Clause 18A. The method of clause 17A, wherein the one or more BDMVR conditions comprise: a) the current block is a bi-prediction coding block; b) the current block has a first reference block in a first reference picture, the first reference picture being in the past compared to a current picture, and a second reference block in a second reference picture, the second reference picture being in the future compared to the current picture; or c) a picture order count (POC) distance between the current picture and the first reference picture is equal to the POC distance between the current picture and the second reference picture.

Clause 19A. The method of any of clauses 4A-18A, wherein a value of the LIC flag being equal to a value greater than 1 is indicative of the application of a higher-order LIC model.

Clause 20A. The method of any of clauses 1A-19A, wherein coding comprises decoding.

Clause 21A. The method of any of clauses 1A-20A, wherein coding comprises encoding.

Clause 22A. A device for coding video data, the device comprising one or more means for performing the method of any of clauses 1A-19A.

Clause 23A. The device of clause 22A, wherein the one or more means comprise one or more processors implemented in circuitry.

Clause 24A. The device of any of clauses 22A and 23A, further comprising one or more memories to store the video data.

Clause 25A. The device of any of clauses 22A-24A, further comprising a display configured to display decoded video data.

Clause 26A. The device of any of clauses 22A-25A, wherein the device comprises one or more of a camera, a computer, a mobile device, a broadcast receiver device, or a set-top box.

Clause 27A. The device of any of clauses 22A-26A, wherein the device comprises a video decoder.

Clause 28A. The device of any of clauses 22A-27A, wherein the device comprises a video encoder.

Clause 29A. A computer-readable storage medium having stored thereon instructions that, when executed, cause one or more processors to perform the method of any of clauses 1A-19A.

Clause 1B A method of decoding video data, the method comprising: determining to decode a current block of the video data using a merge mode; obtaining a flag from a bitstream; determining, based on a value of the flag, to use a second merge list of two merge lists for the current block, wherein the second merge list is based on a first merge list of the two merge lists; and decoding the current block based on the second merge list.

Clause 2B. The method of clause 1B, further comprising: generating a first merge list of the two merge lists; and generating the second merge list based on the first merge list.

Clause 3B. The method of clause 2B, wherein generating the first merge list comprises determining a plurality of merge candidates, each of the plurality of merge candidates in the first merge list having a respective local illumination compensation (LIC) flag value inherited from a respective neighboring block, and wherein generating the second merge list comprises copying the plurality of merge candidates from the first merge list to the second merge list and changing a respective LIC flag value for each of the plurality of merge candidates to an opposite value.

Clause 4B. The method of clause 3B, further comprising trimming the plurality of merge candidates in the second merge list.

Clause 5B. The method of clause 4B, further comprising performing template matching cost-based reordering on the second merge list.

Clause 6B. The method of any of clauses 2B-5B, wherein generating the second merge list comprises changing a local illumination compensation (LIC) flag value associated with the first merge list from false to true, and using a non-local illumination compensation (NLIC) parameter set of a neighboring coding unit to generate two candidates.

Clause 7B. The method of any of clauses 2B-5B, wherein generating the second merge list comprises: determining that a value of local illumination compensation (LIC) flag associated with the first merge list is true; and based on the determination that the value of the LIC flag associated with the first merge list is true, a) changing the value of the LIC flag associated with the first merge list to false for the second merge list, b) keeping the value of the LIC flag associated with the first merge list as true for the second merge list and inherit a LIC parameter set from a neighboring CU, or C) keeping the value of the LIC flag associated with the first merge list as true for the second merge list and inherit an available non-local illumination compensation (NLIC) parameter set from the neighboring CU.

Clause 8B. The method of any of clauses 2B-7B, wherein generating the second merge list comprises: inheriting a local illumination compensation (LIC) parameter set from a neighboring CU; and adjusting at least one of a slope parameter of the LIC parameter set or an offset parameter of the LIC parameter set.

Clause 9B. The method of any of clauses 1B-8B, wherein the merge mode comprises a regular merge mode, a bilateral matching merge mode, a template matching merge mode, an advanced motion vector predictor merge mode, or an affine merge mode.

Clause 10B. The method of clause 9B, wherein the merge mode comprises the affine merge mode, and wherein the first merge list comprises a plurality of candidates, wherein the plurality of candidates comprises at least one affine merge candidate and at least one subblock temporal motion vector predictor merge candidate.

Clause 11B. The method of clause 10B, further comprising generating the second merge list based on the first merge list, wherein generating the second merge list comprises copying the plurality of candidates from the first merge list to the second merge list and inverting a respective local illumination compensation (LIC) flag for each respective of the plurality of candidates in the second merge list, and wherein the second merge list does not include the at least one subblock temporal motion vector predictor merge candidate.

Clause 12B. The method of clause 11B, wherein generating the second merge list further comprises replacing the at least one subblock temporal motion vector predictor merge candidate with at least one other affine merge candidate.

Clause 13B. A device for decoding video data, the device comprising: one or more memories for storing the video data; and one or more processors implemented in circuitry and communicatively coupled to the one or more memories, the one or more processors configured to: determine to decode a current block of the video data using a merge mode; obtain a flag from a bitstream; determine, based on a value of the flag, to use a second merge list of two merge lists for the current block, wherein the second merge list is based on a first merge list of the two merge lists; and decode the current block based on the second merge list.

Clause 14B. The device of clause 13B, wherein the one or more processors are further configured to: generate a first merge list of the two merge lists; and generate the second merge list based on the first merge list.

Clause 15B. The device of clause 14B, wherein as part of generating the first merge list, the one or more processors are configured to determine a plurality of merge candidates, each of the plurality of merge candidates in the first merge list having a respective local illumination compensation (LIC) flag value inherited from a respective neighboring block, and wherein as part of generating the second merge list, the one or more processors are configured to copy the plurality of merge candidates from the first merge list to the second merge list and changing a respective LIC flag value for each of the plurality of merge candidates to an opposite value.

Clause 16B. The device of clause 15B, wherein the one or more processors are further configured to trim the plurality of merge candidates in the second merge list.

Clause 17B. The device of any of clauses 14B-16B, wherein as part of generating the second merge list, the one or more processors are configured to change a local illumination compensation (LIC) flag value associated with the first merge list from false to true, and use a non-local illumination compensation (NLIC) parameter set of a neighboring coding unit to generate two candidates.

Clause 18B. The device of any of clauses 14B-17B, wherein as part of generating the second merge list, the one or more processors are configured to: inherit a local illumination compensation (LIC) parameter set from a neighboring CU; and adjust at least one of a slope parameter of the LIC parameter set or an offset parameter of the LIC parameter set.

Clause 19B. The device of any of clauses 13B-18B, wherein the merge mode comprises a regular merge mode, a bilateral matching merge mode, a template matching merge mode, an advanced motion vector predictor merge mode, or an affine merge mode.

Clause 20B. Non-transitory computer-readable storage media storing instructions, which when executed, cause one or more processors to: determine to decode a current block of video data using a merge mode; obtain a flag from a bitstream; determine, based on a value of the flag, to use a second merge list of two merge lists for the current block, wherein the second merge list is based on a first merge list of the two merge lists; and decode the current block based on the second merge list.

Clause 1C. A method of decoding video data, the method comprising: determining to decode a current block of the video data using a merge mode; generating a first merge list for the current block, wherein generating the first merge list comprises applying template matching to candidates of the first merge list; generating, based on the first merge list, a second merge list; and decoding the current block using the merge mode and based on the first merge list or the second merge list.

Clause 2C. The method of clause 1C, wherein generating the second merge list comprises, prior to applying template matching to the candidates of the first merge list, changing a plurality of local illumination compensation (LIC) flag values associated with the first merge list to opposite values for the second merge list.

Clause 3C. The method of clause 1C, wherein generating the second merge list comprises, after applying template matching to the candidates of the first merge list, changing a plurality of local illumination compensation (LIC) flag values associated with the first merge list to opposite values for the second merge list.

Clause 4C. The method of any of clauses 1C-3C, wherein generating the second merge list comprises, prior to applying template matching to the candidates of the first merge list, trimming candidates of the first merge list for the second merge list.

Clause 5C. The method of any of clauses 1C-3C, wherein generating the second merge list comprises, after applying template matching to the candidates of the first merge list, trimming candidates of the first merge list for the second merge list.

Clause 6C. The method of any of clauses 1C-5C, wherein generating the second merge list comprises: determining that one or more candidates of the first merge list are bi-directional prediction merge candidates; and for each of the bi-directional prediction merge candidates, changing a respective local illumination compensation (LIC) flag value associated with the first merge list to an opposite LIC flag value for the second merge list.

Clause 7C. The method of any of clauses 1C-6C, wherein generating the second merge list comprises: determining whether a block size of the current block is greater than a threshold; and based on a determination that the block size of the current block is greater than the threshold, determining either a) one or more local illumination compensation (LIC) flag values for the second merge list based on template matching cost, or b) the one or more LIC flag values for the second merge list by changing a respective value one or more LIC flags of the first merge list for the second merge list.

Clause 8C. The method of any of clauses 1C-7C, further comprising: obtaining a flag from a bitstream; determining, based on a value of the flag, to use the second merge list to decode the current block; and decoding the current block using the second merge list.

Clause 9C. A device for decoding video data, the device comprising: one or more memories for storing the video data; and one or more processors implemented in circuitry and communicatively coupled to the one or more memories, the one or more processors configured to: determine to decode a current block of the video data using a merge mode; generate a first merge list for the current block including applying template matching to candidates of the first merge list; generate, based on the first merge list, a second merge list; and decode the current block using the merge mode and based on the first merge list or the second merge list.

Clause 10C. The device of clause 9C, wherein as part of generating the second merge list, the one or more processors are configured to, prior to applying template matching to the candidates of the first merge list, change a plurality of local illumination compensation (LIC) flag values associated with the first merge list to opposite values for the second merge list.

Clause 11C. The device of clause 9C, wherein as part of generating the second merge list, the one or more processors are configured to, after applying template matching to the candidates of the first merge list, change a plurality of local illumination compensation (LIC) flag values associated with the first merge list to opposite values for the second merge list.

Clause 12C. The device of any of clauses 9C-11C, wherein as part of generating the second merge list, the one or more processors are configured to, prior to applying template matching to the candidates of the first merge list, trim candidates of the first merge list for the second merge list.

Clause 13C. The device of any of clauses 9C-11C, wherein as part of generating the second merge list, the one or more processors are configured to, after applying template matching to the candidates of the first merge list, trim candidates of the first merge list for the second merge list.

Clause 14C. The device of any of clauses 9C-13C, wherein as part of generating the second merge list, the one or more processors are configured to: determine that one or more candidates of the first merge list are bi-directional prediction merge candidates; and for each of the bi-directional prediction merge candidates, change a respective local illumination compensation (LIC) flag value associated with the first merge list to an opposite LIC flag value for the second merge list.

Clause 15C. The device of any of clauses 9C-15C, wherein as part of generating the second merge list, the one or more processors are configured to: determine whether a block size of the current block is greater than a threshold; and based on a determination that the block size of the current block is greater than the threshold, determine either a) one or more local illumination compensation (LIC) flag values for the second merge list based on template matching cost, or b) the one or more LIC flag values for the second merge list by changing a respective value one or more LIC flags of the first merge list for the second merge list.

Clause 16C. The device of any of clauses 9C-15C, wherein the one or more processors are further configured to: obtain a flag from a bitstream; determine, based on a value of the flag, to use the second merge list to decode the current block; and decode the current block using the second merge list.

Clause 17C. Non-transitory computer-readable storage media storing instructions, which when executed, cause one or more processors to: determine to decode a current block of video data using a merge mode; generate a first merge list for the current block including applying template matching to candidates of the first merge list; generate, based on the first merge list, a second merge list; and decode the current block using the merge mode and based on the first merge list or the second merge list.

Clause 18C. The non-transitory computer-readable storage media of clause 17C, wherein as part of generating the second merge list, the instructions cause the one or more processors to, prior to applying template matching to the candidates of the first merge list, change a plurality of local illumination compensation (LIC) flag values associated with the first merge list to opposite values for the second merge list.

Clause 19C. The non-transitory computer-readable storage media of clause 17C, wherein as part of generating the second merge list, the instructions cause the one or more processors to, after applying template matching to the candidates of the first merge list, change a plurality of local illumination compensation (LIC) flag values associated with the first merge list to opposite values for the second merge list.

Clause 20C. The non-transitory computer-readable storage media of any of clauses 17C-19C, wherein the instructions further cause the one or more processors to: obtain a flag from a bitstream; determine, based on a value of the flag, to use the second merge list to decode the current block; and decode the current block using the second merge list.

Clause 1D. A method of decoding video data, the method comprising: determining to decode a current block of the video data using a merge mode; determining, for the current block, to apply local illumination compensation (LIC); determining, for the current block, to apply decoder side motion vector refinement (DMVR); and decoding the current block based on applying LIC and applying DMVR.

Clause 2D. The method of clause 1D, further comprising obtaining a LIC flag in a bitstream, wherein determining to apply LIC comprises determining a value of the LIC flag, and wherein the value of the LIC flag is indicative of applying LIC.

Clause 3D. The method of any of clauses 1D-2D, wherein applying DMVR comprises using mean removed sum of absolute differences (MRSAD).

Clause 4D. The method of clause 3D, wherein using MRSAD comprises using MRSAD in lieu of a sum of absolute differences (SAD).

Clause 5D. The method of any of clauses 1D-4D, further comprising applying bi-directional optical flow (BDOF) for the current block.

Clause 6D. The method of any of clauses 1D-5D, wherein determining to apply DMVR comprises determining that one or more DMVR conditions are met.

Clause 7D. The method of any of clauses 1D-6D, wherein the merge mode comprises a regular merge mode, a bilateral matching merge mode, a template matching merge mode, an advanced motion vector predictor merge mode, or an affine merge mode.

Clause 8D. The method of clause 7D, wherein the merge mode comprises the affine merge mode, and wherein applying DMVR comprises only applying subblock offset-based affine DMVR refinement.

Clause 9D. The method of clause 7D, wherein the merge mode comprises the affine merge mode, and wherein applying DMVR comprises applying subblock offset-based affine DMVR refinement and regression-based affine DMVR refinement.

Clause 10D. The method of clause 7D, wherein the merge mode comprises the affine merge mode, and wherein applying DMVR comprises applying affine DMVR and bypassing affine model parameter refinement.

Clause 11D. A device for decoding video data, the device comprising: one or more memories for storing the video data; and one or more processors implemented in circuitry and communicatively coupled to the one or more memories, the one or more processors configured to: determine to decode a current block of the video data using a merge mode; determine, for the current block, to apply local illumination compensation (LIC); determine, for the current block, to apply decoder side motion vector refinement (DMVR); and decode the current block based on applying LIC and applying DMVR.

Clause 12D. The device of clause 11D, wherein the one or more processors are further configured to obtain an LIC flag in a bitstream, wherein as part of determining to apply LIC, the one or more processors are configured to determine a value of the LIC flag, and wherein the value of the LIC flag is indicative of applying LIC.

Clause 13D. The device of any of clauses 12D-13D, wherein as part of applying DMVR, the one or more processors are configured to use mean removed sum of absolute differences (MRSAD).

Clause 14D. The device of clause 13D, wherein using MRSAD comprises using MRSAD in lieu of a sum of absolute differences (SAD).

Clause 15D. The device of any of clauses 11D-14D, wherein the one or more processors are further configured to apply bi-directional optical flow (BDOF) for the current block.

Clause 16D. The device of any of clauses 11D-15D, wherein as part of determining to apply DMVR, the one or more processors are configured to determine that one or more DMVR conditions are met.

Clause 17D. The device of any of clauses 11D-16D, wherein the merge mode comprises a regular merge mode, a bilateral matching merge mode, a template matching merge mode, an advanced motion vector predictor merge mode, or an affine merge mode.

Clause 18D. The device of clause 17D, wherein the merge mode comprises the affine merge mode, and wherein as part of applying DMVR, the one or more processors are configured to apply only subblock offset-based affine DMVR refinement.

Clause 19D. The device of clause 17D, wherein the merge mode comprises the affine merge mode, and wherein as part of applying DMVR, the one or more processors are configured to apply subblock offset-based affine DMVR refinement and regression-based affine DMVR refinement.

Clause 20D. Non-transitory computer-readable storage media storing instructions, which when executed, cause one or more processors to: determine to decode a current block of video data using a merge mode; determine, for the current block, to apply local illumination compensation (LIC); determine, for the current block, to apply decoder side motion vector refinement (DMVR); and decode the current block based on applying LIC and applying DMVR.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining to decode a current block of the video data using a merge mode;

generating a first merge list for the current block comprising determining a plurality of merge candidates, each of the plurality of merge candidates in the first merge list having a respective local illumination compensation (LIC) flag;

generating, based on the first merge list for the current block, a second merge list for the current block comprising copying the plurality of merge candidates from the first merge list to the second merge list and changing a respective LIC flag value for each of the plurality of merge candidates to an opposite value;

obtaining a flag from a bitstream;

determining, based on a value of the flag, to use the second merge list for the current block; and decoding the current block based on the second merge list.

2. The method of claim 1, wherein generating the first merge list comprises for each of the plurality of merge candidates in the first merge list, inheriting the respective LIC flag value from a respective neighboring block.

3. The method of claim 2, further comprising trimming the plurality of merge candidates in the second merge list.

4. The method of claim 3, further comprising performing template matching cost-based reordering on the second merge list.

5. The method of claim 1, wherein generating the second merge list comprises changing a first LIC flag value associated with the first merge list from false to true, and using a non-local illumination compensation (NLIC) parameter set of a neighboring coding unit to generate two candidates.

6. The method of claim 1, wherein generating the second merge list comprises:

determining that a value of first LIC flag associated with the first merge list is true; and based on the determination that the value of the first LIC flag associated with the first merge list is true, changing the value of the first LIC flag associated with the first merge list to false for the second merge list.

7. The method of claim 1, wherein generating the second merge list comprises:

inheriting a local illumination compensation (LIC) parameter set from a neighboring CU; and adjusting at least one of a slope parameter of the LIC parameter set or an offset parameter of the LIC parameter set.

8. The method of claim 1, wherein the merge mode comprises a regular merge mode, a bilateral matching merge mode, a template matching merge mode, an advanced motion vector predictor merge mode, or an affine merge mode.

9. The method of claim 8, wherein the merge mode comprises the affine merge mode, and wherein the plurality of merge candidates comprises at least one affine merge candidate and at least one subblock temporal motion vector predictor merge candidate.

10. The method of claim 9, wherein the second merge list does not include the at least one subblock temporal motion vector predictor merge candidate.

11. The method of claim 10, wherein generating the second merge list further comprises replacing the at least one subblock temporal motion vector predictor merge candidate with at least one other affine merge candidate.

12. A device for decoding video data, the device comprising:

one or more memories for storing the video data; and one or more processors implemented in circuitry and communicatively coupled to the one or more memories, the one or more processors configured to:

determine to decode a current block of the video data using a merge mode;

generate a first merge list for the current block, wherein as part of generating the first merge list for the current block, the one or more processors are configured to determine a plurality of merge candidates, each of the plurality of merge candidates in the first merge list having a respective local illumination compensation (LIC) flag;

generate, based on the first merge list for the current block, a second merge list for the current block, wherein as part of generating the second merge list for the current block, the one or more processors are configured to copy the plurality of merge candidates from the first merge list to the second merge list and changing a respective LIC flag value for each of the plurality of merge candidates to an opposite value;

obtain a flag from a bitstream;

determine, based on a value of the flag, to use the second merge list for the current block; and decode the current block based on the second merge list.

13. The device of claim 12, wherein as part of generating the first merge list, for each of the plurality of merge candidates in the first merge list, inherit the respective LIC flag value from a respective neighboring block.

14. The device of claim 13, wherein the one or more processors are further configured to trim the plurality of merge candidates in the second merge list.

15. The device of claim 12, wherein as part of generating the second merge list, the one or more processors are configured to change a first LIC flag value associated with the first merge list from false to true, and use a non-local illumination compensation (NLIC) parameter set of a neighboring coding unit to generate two candidates.

16. The device of claim 12, wherein as part of generating the second merge list, the one or more processors are configured to:

inherit a local illumination compensation (LIC) parameter set from a neighboring CU; and adjust at least one of a slope parameter of the LIC parameter set or an offset parameter of the LIC parameter set.

17. The device of claim 12, wherein the merge mode comprises a regular merge mode, a bilateral matching merge mode, a template matching merge mode, an advanced motion vector predictor merge mode, or an affine merge mode.

18. Non-transitory computer-readable storage media storing instructions, which when executed, cause one or more processors to:

determine to decode a current block of video data using a merge mode;

generate a first merge list for the current block, wherein as part of generating the first merge list for the current block, the instructions cause the one or more processors to determine a plurality of merge candidates, each of the plurality of merge candidates in the first merge list having a respective local illumination compensation (LIC) flag;

generate, based on the first merge list for the current block, a second merge list for the current block, wherein as part of generating the second merge list for the current block, the instructions cause the one or more processors to copy the plurality of merge candidates from the first merge list to the second merge list and changing a respective LIC flag value for each of the plurality of merge candidates to an opposite value;

obtain a flag from a bitstream;

determine, based on a value of the flag, to use the second merge list for the current block; and decode the current block based on the second merge list.

* * * * *